United States Patent
Tsuzaka

(10) Patent No.: US 9,764,745 B2
(45) Date of Patent: Sep. 19, 2017

(54) BRAKE SYSTEM FOR RAIL CARS, BRAKE CONTROL DEVICE FOR RAIL CAR, AND BRAKE CONTROL METHOD FOR RAIL CARS

(71) Applicant: NABTESCO CORPORATION, Tokyo (JP)

(72) Inventor: Takahiro Tsuzaka, Kobe (JP)

(73) Assignee: NABTESCO CORPORATION, Tokyo (JP)

(*) Notice: Subject to any disclaimer, the term of this patent is extended or adjusted under 35 U.S.C. 154(b) by 0 days.

(21) Appl. No.: 14/909,605

(22) PCT Filed: Aug. 5, 2014

(86) PCT No.: PCT/JP2014/070643
§ 371 (c)(1),
(2) Date: Feb. 2, 2016

(87) PCT Pub. No.: WO2015/020062
PCT Pub. Date: Feb. 12, 2015

(65) Prior Publication Data
US 2016/0176419 A1    Jun. 23, 2016

(30) Foreign Application Priority Data
Aug. 6, 2013 (JP) .................... 2013-163479

(51) Int. Cl.
*B61H 11/00* (2006.01)
*B61H 11/02* (2006.01)
(Continued)

(52) U.S. Cl.
CPC ............ *B61H 11/02* (2013.01); *B60L 3/0076* (2013.01); *B60L 7/26* (2013.01); *B60L 15/2009* (2013.01);
(Continued)

(58) Field of Classification Search
CPC combination set(s) only.
See application file for complete search history.

(56) References Cited

U.S. PATENT DOCUMENTS 4,106,821 A * 8/1978 Brearley ................ B60T 8/885
303/122.06
4,692,867 A    9/1987 Poole
(Continued)

FOREIGN PATENT DOCUMENTS

JP    2001-314001 A    11/2001
JP    2004-101487 A    4/2004
(Continued)

OTHER PUBLICATIONS

International Preliminary Report on Patentability and the Written Opinion of the International Searching Authority as issued in International Patent Application No. PCT/JP2014/070643, dated Feb. 9, 2016.
(Continued)

*Primary Examiner* — Yonel Beaulieu
(74) *Attorney, Agent, or Firm* — Pillsbury Winthrop Shaw Pittman LLP

(57) ABSTRACT

Provided are a brake system, a brake device, and a method of controlling brakes for railroad cars in which control can be multiplexed with a simple configuration. In a brake system 1 for railroad cars includes brake control devices 11, 12, 13 provided in railroad cars 101, 102 103 respectively that form a unit 104. Each brake control device 10 (11, 12, 13) is capable of outputting information of the corresponding car (101, 102, 103) to the other brake control devices 10 through a transmission device 20. The brake control device 10 can calculate a total necessary braking force value BRA required for braking all of the cars 101, 102 103 using the
(Continued)

information output from the other brake control devices 10 to the transmission device 20.

21 Claims, 23 Drawing Sheets

(51) Int. Cl.
*B61H 11/04* (2006.01)
*B61L 3/00* (2006.01)
*B60L 7/00* (2006.01)
*B60T 7/00* (2006.01)
*B60L 3/00* (2006.01)
*B60L 7/26* (2006.01)
*B60T 8/17* (2006.01)
*B61H 9/00* (2006.01)
*B60L 15/20* (2006.01)

(52) U.S. Cl.
CPC ............ *B60T 8/1705* (2013.01); *B61H 9/006* (2013.01); *B60L 2200/26* (2013.01)

(56) References Cited

U.S. PATENT DOCUMENTS

| | | | | |
|---|---|---|---|---|
| 4,781,622 A * | 11/1988 | Ratchford | ............... | H01R 24/58 439/585 |
| 5,061,883 A * | 10/1991 | Asano | ............... | B60L 7/24 318/362 |
| 5,201,834 A * | 4/1993 | Grazioli | ............... | B60T 8/885 246/167 R |
| 5,713,639 A | 2/1998 | Doto et al. | | |
| 6,062,657 A | 5/2000 | Dimasi | | |
| 7,720,588 B2 * | 5/2010 | Alvarez | ............... | B60T 7/122 180/170 |
| 8,112,191 B2 * | 2/2012 | Kumar | ............... | B60L 7/18 701/22 |
| 9,376,971 B2 * | 6/2016 | Luther | ............... | B61L 3/006 |
| 2006/0163939 A1 * | 7/2006 | Kuramochi | ............... | B60T 8/885 303/122.04 |
| 2011/0231039 A1 * | 9/2011 | Leitel | ............... | B60T 8/1893 701/19 |
| 2012/0090499 A1 * | 4/2012 | Shimada | ............... | B61C 3/02 105/49 |
| 2012/0200243 A1 | 8/2012 | Kono et al. | | |
| 2014/0042279 A1 | 2/2014 | Kadono et al. | | |
| 2014/0244080 A1 * | 8/2014 | Herden | ............... | B60T 17/228 701/19 |

FOREIGN PATENT DOCUMENTS

| | | |
|---|---|---|
| JP | 2007-089269 A | 4/2007 |
| JP | 4638959 B1 | 2/2011 |
| JP | 2011-055416 A | 3/2011 |
| WO | WO 2004/054840 A1 | 7/2004 |
| WO | WO 2011/070651 A1 | 6/2011 |
| WO | WO 2012/176295 A1 | 12/2012 |

OTHER PUBLICATIONS

International Search Report as issued in International Patent Application No. PCT/JP2014/070643, dated Nov. 11, 2014.
Extended European Search Report as issued in European Patent Application No. 14835236.2, dated Mar. 14, 2017.

* cited by examiner (a) When Failure Of Transmission From The Brake Control Device 11 To The Transmission Device 21 In The Trailer Car Occurs (a-1) Independent Brake Control Of Trailer Car 101

(a-2) Independent Brake Control Of Trailer Car 102

(b) When Failure Of Transmission From The Brake Control Device 12 To The Transmission Device 22 In The Motor Car 102 Occurs (c) When Failure Of Transmission From The Transmission Device 21 to The Brake Control Device 11 In The Trailer Car 101 Occurs (c-1) When The Motor Cars 102, 103 In Cooperation Perform Braking Operation (c-1) When The Motor Cars 102, 103 In Cooperation Perform Braking Operation (d) When Failure Of Transmission From The Transmission Device 22 to The Brake Control Device 12 In The Motor Car 102 Occurs (d-1) When Motor Car 102 And Trailer Car 101 In Which No Failure Occurs Perform The Braking Operation In Cooperation (d-1) When Motor Car 102 And Trailer Car 101 In Which No Failure Occurs Perform The Braking Operation In Cooperation

BRAKE SYSTEM FOR RAIL CARS, BRAKE CONTROL DEVICE FOR RAIL CAR, AND BRAKE CONTROL METHOD FOR RAIL CARS

CROSS-REFERENCE TO RELATED APPLICATIONS

This application is the U.S. National Stage of PCT/JP2014/070643, filed Aug. 5, 2014, which in turn claims priority to Japanese Patent Application No. JP 2013-163479, filed Aug. 6, 2013. The contents of these applications are incorporated herein by reference in their entireties.

TECHNICAL FIELD

The present invention relates to a brake system, a brake control device, and a method of controlling brakes for railroad cars.

BACKGROUND

A brake control device for railroad cars is typically configured to control all the brake devices attached to a plurality of cars in a train (see, for example, Patent Document 1).

RELEVANT REFERENCES

List of Relevant Patent Literature

Patent Literature 1: Japanese Patent No. 4638959

SUMMARY

Usually, a brake control device for railroad cars is duplexed for safety. More specifically, a spare brake control device is provided to railroad cars in case an original brake control device breaks down and cannot be operated. However, the duplexing of the brake control device may not be sufficient enough since it is still possible for both of the brake control devices to break down. In order to mitigate the possibility of breakdowns of the brake control devices, the brake control device can be further multiplexed such as triplexed, quadplexed and so on. However, multiplexing of the brake control device requires a number of brake control devices for backup, which complicates the brake system of the railroad cars.

One object of the invention is to provide a brake system, a brake device, and a method of controlling brakes for railroad cars in which control can be multiplexed with a simple configuration.

(1) To this end, in a brake system for railroad cars according to one aspect of the invention, each of the brake control devices is capable of outputting information about the corresponding car in which the brake control device is provided to the other brake control devices through a transmission device. The brake control device is configured to calculate a total necessary braking force value by using the information output from the other brake control devices to the transmission device, the total necessary braking force value being required for braking all of the railroad cars forming the unit.

In this way, when the brake system normally operates, each brake control device uses the information from the other brake control devices to calculate the total necessary braking force value that is required for braking the whole unit including the railroad cars. Therefore it is possible for the railroad car brake system to perform the braking process of the cars. The brake control devices are provided in the cars of the unit respectively. Therefore, even when a failure occurs in the transmission device, the control by each brake control device can cause the cars in the unit to perform the brake operation. In this way, multiplexing of the brake control device can be achieved. Moreover, the multiplexing can be realized with a simple configuration in which the brake control device is provided for each of the cars. In this manner, the multiplexing of the control can be realized with such a simple configuration.

(2) It is preferable that when the brake control devices each receive a deceleration command signal, the brake control device calculate a necessary braking force that is required for braking the corresponding car and output the necessary braking force value as the information to the transmission device.

With this configuration, the information necessary to calculate the total necessary braking force value can be obtained by simply calculating the necessary braking force value that is required for braking the corresponding car by each brake control device.

(3) More preferably, the brake control devices each calculate the total necessary braking force value by adding the necessary braking force values calculated by the other brake control devices to the necessary braking force value that is required for braking the corresponding car.

In this manner, the brake system for railroad cars can calculate the total necessary braking force value with such a simple configuration.

(4) More preferably, one of the brake control devices is configured as a motor-car brake control device provided in a motor car that is the railroad car equipped with a motor, and the motor-car brake control device is configured to calculate a target regenerative braking force value that is to be generated in the motor based on the total necessary braking force value.

In this manner, the railroad car brake control system can estimate more appropriate target regenerative braking force value.

(5) More preferably, the railroad cars each include a mechanical brake device that imparts a friction resistance to a wheel, and the brake control devices each calculate a target mechanical braking force value that is to be generated by the mechanical brake device of the corresponding car based on a value obtained by subtracting a regenerative braking force value actually generated in the motor car from the total necessary braking force value.

In this way, the railroad car brake system can estimate more appropriate target mechanical braking force value by considering the regenerative braking force value actually generated.

(6) It is preferable that one of the brake control devices be configured as a trailer-car brake control device provided in a trailer car that is one of the railroad cars, and when the trailer-car brake control device cannot transmit the information to the transmission device, the trailer-car brake control device calculates a necessary braking force value that is required to put a brake on the trailer car without using the information output from the other brake control devices to the transmission device.

In this manner, the trailer-car brake control device can calculate the necessary braking force value that is required for braking the trailer car even when a communication failure occurs in the trailer-car brake control device. Therefore the trailer-car brake control device can perform a brake control of the trailer car and can prevent a deficiency in the total braking force of the whole unit.

(7) It is preferable that one of the brake control devices is configured as a motor-car brake control device provided in a motor car that is the railroad car equipped with a motor, and when the trailer-car brake control device cannot transmit the information to the transmission device, the motor-car brake control device calculates a necessary braking force value that is required to put a brake on the motor car without using the information output from the other brake control devices to the transmission device.

In this manner, the motor-car brake control device can calculate the necessary braking force value that is required for braking the motor car even when a communication failure occurs in the trailer-car brake control device. Therefore the motor-car brake control device can perform a brake control of the motor car and can prevent a deficiency in the total braking force of the whole unit.

(8) It is preferable that one of the brake control devices be configured as a motor-car brake control device provided in a motor car that is the railroad car equipped with a motor, and when the motor-car brake control device cannot transmit the information to the transmission device, the motor-car brake control device calculates a necessary braking force value that is required for braking the motor car without using the information output from the other brake control devices to the transmission device.

In this manner, the motor-car brake control device can calculate the necessary braking force value that is required for braking the motor car even when a communication failure occurs in the motor-car brake control device. Therefore the motor-car brake control device can perform a brake control of the motor car and can prevent a deficiency in the total braking force of the whole unit.

(9) More preferably, the motor car includes the motor coupled to a wheel of the motor car, and a mechanical brake device that imparts a friction resistance to the wheel, the motor-car brake control device causes the mechanical brake device to operate without causing the motor to perform a regenerative braking operation.

In this way, it is possible for the motor-car brake control device to cause the mechanical brake device to perform the braking operation even when the information cannot be transmitted to the transmission device.

(10) More preferably, the brake control devices other than the motor-car brake control device are herein referred to as predetermined brake control devices, and when the information cannot be transmitted from the motor-car brake control device to the transmission device, the predetermined brake control devices calculate a necessary braking force value that is required for braking all the cars other than the motor car.

In this way, even when a communication failure occurs in the motor-car brake control device, the brake control devices other than the brake control device in which the communication failure occurs can cooperate to perform the brake control over the cars other than the motor car in which the communication failure occurs. Consequently, it is possible to prevent insufficiency of braking force for the unit as a whole.

(11) It is preferable that one of the brake control devices be configured as a trailer-car brake control device provided in a trailer car that is one of the railroad cars, and when the trailer-car brake control device cannot receive the information from the transmission device, the trailer-car brake control device calculate a necessary braking force value that is required to put a brake on the trailer car without using the information output from the other brake control devices to the transmission device.

In this manner, the trailer-car brake control device can calculate the necessary braking force value that is required for braking the trailer car even when a communication failure occurs in the trailer-car brake control device. Therefore the trailer-car brake control device can perform a brake control of the trailer car and can prevent a deficiency in the total braking force of the whole unit.

(12) More preferably, when the trailer-car brake control device cannot receive the information from the transmission device, the trailer-car brake control device calculates a necessary braking force value that is required for braking the trailer car based on a deceleration command signal at the time when the reception failure occurs.

In this manner, the trailer-car brake control device can continue the process of for braking the trailer car even when a communication failure occurs.

(13) More preferably, the brake control devices other than the trailer-car brake control device are herein referred to as predetermined brake control devices, and when the trailer-car brake control device cannot receive the information from the transmission device, the predetermined brake control devices each calculate a necessary braking force value that is required to put a brake on the corresponding car and estimate a necessary braking force value that is required to put a brake on the trailer car in order to calculate a total necessary braking force value that is required for braking all of the cars.

In this way, by considering the trailer car in which a communication failure occurs, it is possible for the other brake control devices to accurately calculate the necessary braking force value that should be generated in the corresponding car.

(14) More preferably, the predetermined brake control devices estimate the necessary braking force value that is required for braking the trailer car based on a necessary braking value that is required to put a brake on the trailer car and calculated by the trailer-car brake control device before the reception failure occurs.

In this way, the brake control devices other than the trailer-car brake control device can accurately calculate the necessary braking force value that is required for braking the trailer car even when a communication failure occurs in the trailer-car brake control device.

(15) More preferably, when the trailer-car brake control device becomes incapable of receiving the information from the transmission device while a deceleration operation is performed in the trailer car, the predetermined brake control devices calculate a corrected total necessary braking force value by subtracting a braking force value generated in the deceleration operation of the trailer car from the total necessary braking force value.

In this way, by considering the braking operation of the trailer-car brake control device in which a communication failure occurs, it is possible for the other brake control devices to accurately calculate the necessary braking force value that should be generated in the corresponding car.

(16) It is preferable that one of the brake control devices be configured as a motor-car brake control device provided in a motor car that is the railroad car equipped with a motor, and when the motor-car brake control device cannot receive the information from the transmission device, the motor-car brake control device calculate a necessary braking force value that is required for braking the motor car without using the information output from the other brake control devices to the transmission device.

In this manner, the motor-car brake control device can calculate the necessary braking force value that is required for braking the motor car even when a communication failure occurs in the motor-car brake control device. Therefore the motor-car brake control device can perform a brake control of the motor car and can prevent a deficiency in the total braking force of the whole unit.

(17) More preferably, when the motor-car brake control device cannot receive the information from the transmission device, the motor-car brake control device calculates a necessary braking force value that is required for braking the motor car based on a deceleration command signal at the time when the reception failure occurs.

In this manner, the motor-car brake control device can continue the process of putting a brake on the motor car even when a communication failure occurs.

(18) More preferably, the motor car includes the motor coupled to a wheel of the motor car, and a mechanical brake device that imparts a frictional resistance to the wheel, when the motor-car brake control device cannot receive the information from the transmission device, the motor-car brake control device causes the mechanical brake device to operate without causing the motor to perform a regenerative braking operation.

In this way, the motor-car brake control device can perform control such that an appropriate braking force is applied to the motor car even when measurement of the regenerative braking force of the motor cannot be performed.

(19) More preferably, the brake control devices other than the motor-car brake control device are herein referred to as predetermined brake control devices, and when the motor-car brake control device cannot receive the information from the transmission device, the predetermined brake control devices each calculate a necessary braking force value that is required for braking the corresponding car and estimate a necessary braking force value that is required for braking the motor car in order to calculate a total necessary braking force value that is required for braking all of the cars.

In this way, by considering the motor car in which a communication failure occurs, it is possible for the other brake control devices to accurately calculate the necessary braking force value that should be generated in the corresponding car.

(20) More preferably, the predetermined brake control devices estimate the necessary braking force value that is required for braking the motor car based on a necessary braking value that is required for braking the motor car and calculated by the motor-car brake control device before the reception failure occurs.

In this way, the brake control devices other than the motor-car brake control device can accurately calculate the necessary braking force value that is required for braking the motor car even when a communication failure occurs in the motor-car brake control device.

(21) More preferably, when the motor-car brake control device becomes incapable of receiving the information from the transmission device while a deceleration operation is performed in the motor car, the predetermined brake control devices calculate a corrected total necessary braking force value by subtracting a braking force value generated in the deceleration operation of the motor car from the total necessary braking force value.

In this way, by considering the braking operation of the motor-car brake control device in which a communication failure occurs, it is possible for the other brake control devices to accurately calculate the necessary braking force value that should be generated in the corresponding car.

(22) A brake control device according to another aspect of the invention is a brake control device used for the above-described brake system for railroad cars. The brake control device is capable of outputting information about the corresponding car in which the brake control device is provided to the other brake control devices through a transmission device, and configured to calculate a total necessary braking force value by using the information output from the other brake control devices to the transmission device, the total necessary braking force value being required for braking all of the railroad cars.

In this way, when the brake system normally operates, each brake control device uses the information from the other brake control devices to calculate the total necessary braking force value that is required for braking the whole unit including the railroad cars. Therefore it is possible for the railroad car brake system to perform the braking process of the cars. The brake control devices are provided in the cars of the unit respectively. Therefore, even when a failure occurs in the transmission device, the control by each brake control device can cause the cars in the unit to perform the brake operation. In this way, multiplexing of the brake control device can be achieved. Moreover, the multiplexing can be realized with a simple configuration in which the brake control device is provided for each of the cars. In this manner, the multiplexing of the control can be realized with such a simple configuration.

(23) A method of controlling brakes on railroad cars according to another aspect of the invention may include outputting, by each of brake control devices provided respectively in railroad cars forming a unit, information about the corresponding railroad car in which the brake control unit is provided through a transmission device to the other brake control devices; and calculating, by each of the brake control devices, a total necessary braking force value by using the information output from the other brake control devices to the transmission device, the total necessary braking force value being required for braking all of the railroad cars forming the unit.

In this way, when the brake system normally operates, each brake control device uses the information from the other brake control devices to calculate the total necessary braking force value that is required for braking the whole unit including the railroad cars. Therefore according to the method, it is possible to perform the braking process of the railroad cars. The brake control devices are provided in the cars of the unit respectively. Therefore, even when a failure occurs in one of the transmission devices, the control by each brake control device can cause the cars in the unit to perform the brake operation. In this way, multiplexing of the brake control device can be achieved. Moreover, the multiplexing can be realized with a simple configuration in which the brake control device is provided for each of the cars. In this manner, the multiplexing of the control can be realized with such a simple configuration.

In this manner, according to the aspect of the invention, the multiplexing of the control can be realized with such a simple configuration.

DESCRIPTION OF THE PREFERRED EMBODIMENTS

The embodiments of the present invention will now be described with reference to the drawings. The invention will not be limited to the following embodiments but can be applied to any other brake systems, brake control devices, and brake controlling methods for railroad cars.

General Configuration of a Train of Railroad Cars

Figure 1:
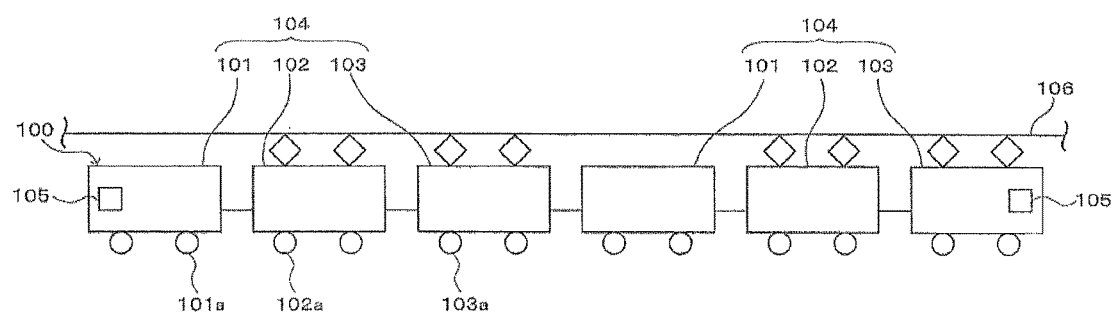
FIG. 1 is a block diagram of a train of railroad cars equipped with a brake system for railroad cars according to an embodiment of the invention.
Figure 2:
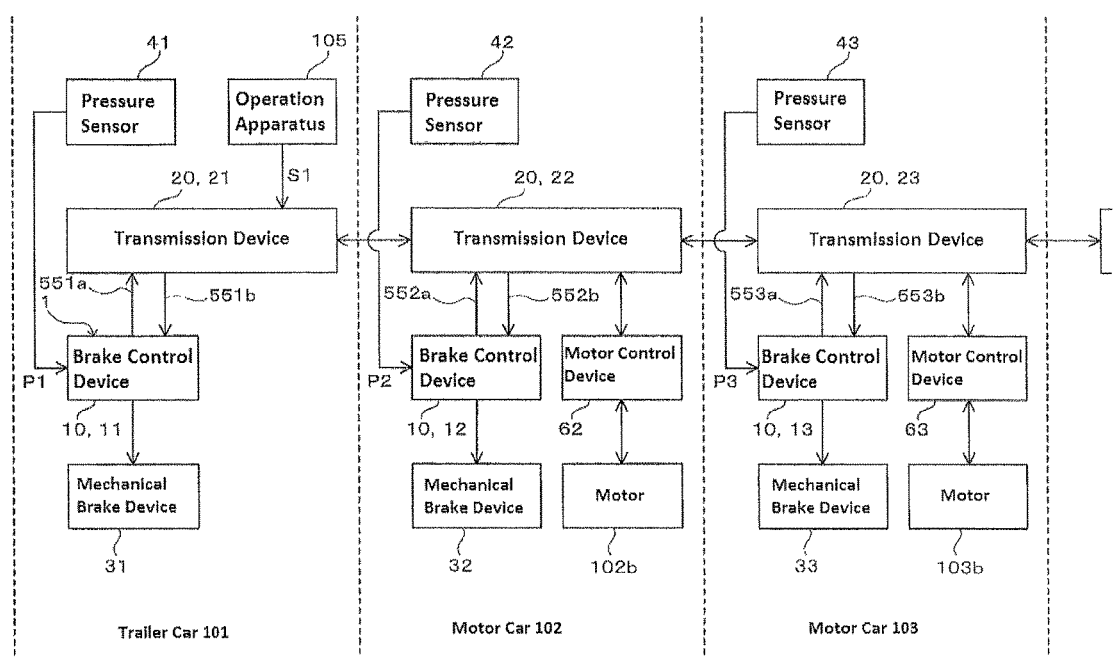
FIG. 2 is a block diagram illustrating a unit of railroad cars.

FIG. 1 is a block diagram of a train 100 of railroad cars equipped with a brake system for railroad cars according to an embodiment of the invention. FIG. 2 is a block diagram illustrating a unit 104 of railroad cars in the train 100.

Referring to FIGS. 1 and 2, the train 100 of the railroad cars may include trailer cars 101, and motor cars 102, 103. The unit 104 may include the trailer car 101, the motor car 102 and the motor car 103 sequentially connected to each other, and the train 100 includes more than one unit 104 of railroad cars. The train 100 of the railroad cars may have an operation apparatus 105 at a first car (the trailer 101 in this embodiment) and the last car (the motor car 103 in this embodiment). The operation apparatus 105 may output a deceleration command signal S1, an acceleration command signal and the like when an operator of the train operates the apparatus. The configuration of each unit 104 is the same in the train so that a single unit 104 will be hereunder described.

The trailer car 101 and the motor cars 102, 103 in the unit 104 may respectively have a brake control device 10 (11, 12, 13). The brake control devices 11, 12, 13 are herein collectively referred to as the brake control device 10. A brake system 1 may include the brake control devices 11, 12, 13.

The brake control device 11 is configured as a trailer-car brake control device equipped in the trailer 101. The brake control devices 12, 13 are configured as motor-car brake control devices equipped in the motor cars 102, 103, respectively.

The brake control devices 11, 12, 13 can output information about a braking operation of the corresponding cars 101, 102, 103 in which the brake control devices 11, 12, 13 are provided respectively to other brake control device 10 through a transmission device 20 (21, 22, 23). Each brake control device 10 may use the information about a braking operation that is output to other brake control device 10 through the transmission device 20 in order to estimate an total necessary braking force value BRA that is required for braking the whole unit 104 (the cars 101, 102, 103).

The transmission devices 21, 22, 23 are provided to the cars 101, 102, 103 respectively. The transmission devices 21, 22, 23 are provided as communication devices that can communicate information signals to each other. In this embodiment, the transmission devices 21, 22, 23 are collectively referred to as the transmission device 20.

The trailer car 101 does not have a motor as an engine that provides an accelerating force to the trailer car 101, but can be propelled by the motor cars 102, 103. The motor cars 102, 103 may include motors 102b, 103b, respectively, as engines that provide acceleration forces to the motor cars 102, 103. The motors 102b, 103b are powered by electricity supplied from an overhead line 106.

The trailer car 101, the motor car 102, and the motor car 103 may be interconnected through the transmission device 20. The trailer car 101, the motor car 102, and the motor car 103 may be configured to receive instruction signals from the operation apparatus 105 through the transmission device 20.

The trailer car 101 may include the transmission device 21, the brake control device 11, and a mechanical brake device 31, and a pressure sensor 41.

The transmission device 21 is configured to perform input and output of an electric signal. The transmission device 21 may be electrically connected to the transmission device 22 of the adjacent motor car 102 and the brake control device 11.

Figure 3:
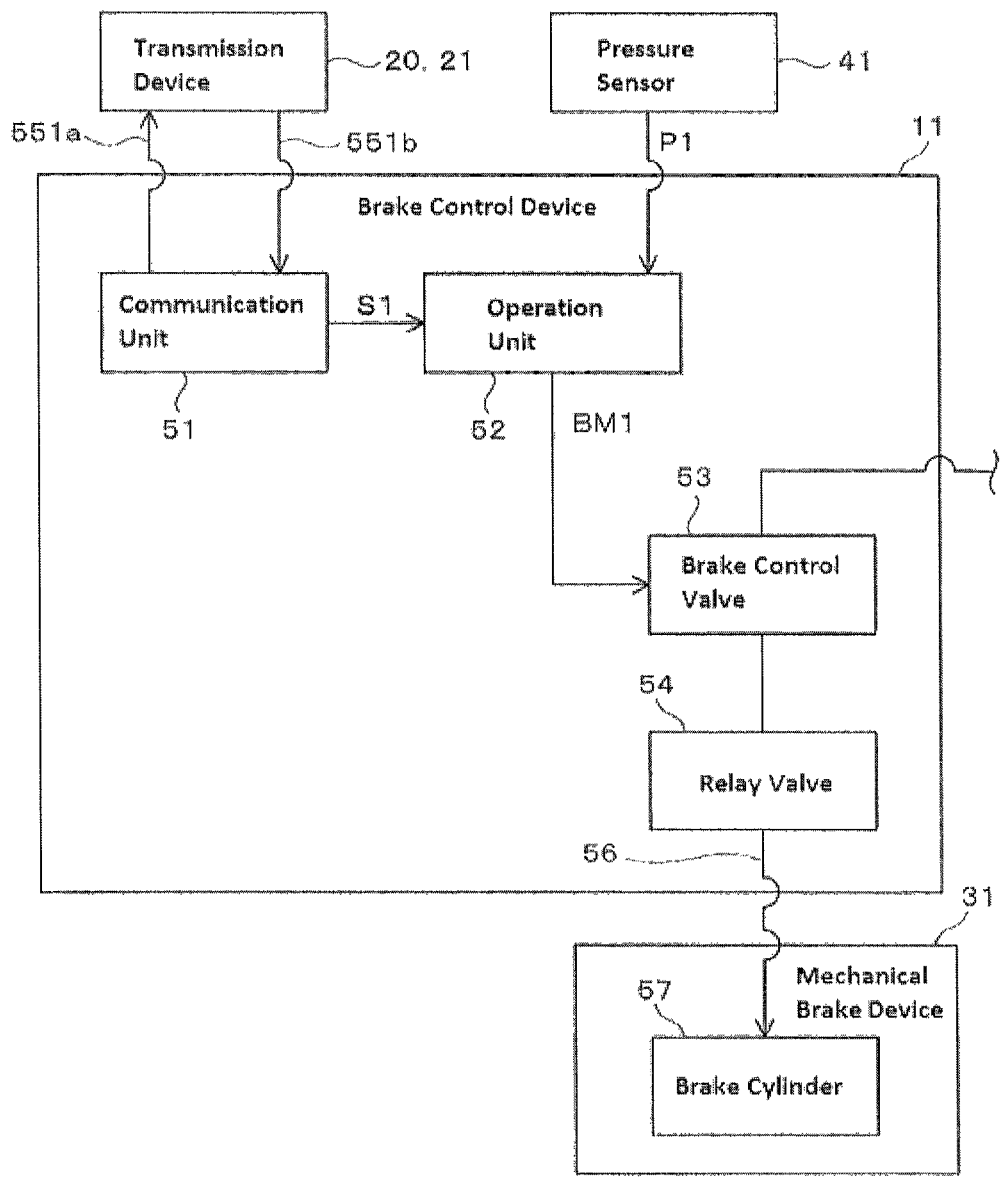
FIG. 3 is a block diagram of a brake control device and a mechanical brake device.

The brake control device 11 is configured to control the mechanical brake device 31 of the trailer car 101. FIG. 3 is a block diagram of the brake control device 11 and the mechanical brake device 31.

Referring to FIGS. 1 to 3, the brake control device 11 in the embodiment may have, for example, a Programmable Logic Controller (PLC) or the like, which includes a Central Processing Unit (CPU), Random Access Memory (RAM), Read Only Memory (ROM) and the like.

The brake control device 11 may include a communication unit 51, an operation unit 52, a brake control valve 53, and a relay valve 54.

The communication unit 51 is provided for communication with the transmission device 21. The communication unit 51 may include an input line 551b and an output line 551a. The input line 551b is configured to receive an electric signal from the transmission line 21. The output line 551a is configured to output an electric signal to the transmission line 21. When the communication unit 51 of the brake control device 11 communicates with the transmission device 21, upon transmission of a signal from one of the brake control device 11 and the transmission device 21, the other of the brake control device 11 and the transmission device 21 is configured to send a response signal. When there is no response from the other after a predetermined time period has elapsed since the one transmitted the signal, the one may determine that a communication failure has occurred. In this case, the one may generate a communication failure signal S3 that indicates that the communication failure has occurred.

The communication failure signal S3 is output to the brake control devices 12, 13 through the transmission device 20. The communication unit 51, the operation unit 52, and the brake control valve 53 are physically separated. If the brake control valve 53 is broken, the operation unit 52 outputs a brake control failure occurrence signal to the transmission device 20 through the communication unit 51. Unlike the brake control valve 53, the communication unit 51 and the operation unit 52 do not have movable parts so that they are less likely to be physically broken. The communication unit 51 can be made as a small-sized unit. Therefore, it is easy to duplicate the communication unit 51 in the brake control device 11. The communication unit 51 is coupled to the operation unit 52.

The operation unit 52 is configured to calculate a necessary braking force value BR1 that is required to decelerate the trailer car 101 based on a commanded deceleration amount indicated by the deceleration command signal S1 provided from the operation apparatus 105 through the transmission device 21 and a pressure detection signal P1 from the pressure sensor 41. In this embodiment, the necessary brake value BR1 is the same as a target mechanical braking force value BM1. The pressure sensor 41 may be connected to an air spring (not shown) of the trailer car 101 to output a pressure detection signal P1 as a pressure value corresponding to the weight of the trailer car 101.

The operation unit 52 outputs, to the brake control valve 53, a valve operation signal based on the calculated target mechanical braking force value BM1. The brake control valve 53 opens to an amount indicated by the valve operation signal. In this way, a pressure within a brake pipe 56 that is coupled to the brake control valve 53 is changed. The brake pipe 56 is supplied with compressed air from an air compressor (not shown). A change in the pressure within the brake pipe 56 is propagated to a brake cylinder 57 of the mechanical brake device 31 through the relay valve 54. In this manner, the brake cylinder 57 operates and a brake caliper (not shown) coupled to the brake cylinder 57 is operated. As a result, a brake pad fixed to the brake caliper touches a wheel 101a of the trailer car 101 and a frictional resistance is given to the wheel 101a. In this manner, braking of the trailer car 101 is performed.

The motor car 102 may include the transmission device 22, the brake control device 12, the machine brake device 32, the pressure sensor 42, the motor control device 62, and the motor 102b coupled to a wheel 102a of the motor car 102.

The transmission device 22 have the same configuration as the transmission device 21, and is electrically coupled to the transmission devices 21, 23 of the adjacent cars 101, 103, the brake control device 12, and the motor control device 62.

The brake control device 12 is configured to control the mechanical brake device 32 and the motor 102b of the motor car 102.

The brake control device 12 and the mechanical brake device 32 have the same configurations as the brake control device 11 and the mechanical brake device 31 respectively. The brake control device 12 is configured to calculate a necessary braking force value BR2 that is required for braking the motor car 102 based on a deceleration command indicated by the deceleration command signal S1 and a pressure detection signal P2 from the pressure sensor 42. The pressure sensor 42 may be connected to an air spring (not shown) of the motor car 102 to output the pressure detection signal P2 corresponding to the weight of the motor car 102. A brake cylinder (not shown) of the mechanical brake device 32 is operated to generate a target mechanical braking force value BM2 which will be hereunder described. In this manner, a frictional resistance is imparted to the wheel 102a of the motor car 102, and braking of the motor car 102 is performed.

The communication unit of the brake control device 12 is provided for communication with the transmission device 22. The communication unit may include an input line 552b and an output line 552a. The input line 552b is configured to receive an electric signal from the transmission device 22. The output line 552a is configured to output an electric signal to the transmission device 22. When the brake control device 12 communicates with the transmission device 22, upon transmission of a signal from one of the brake control device 12 and the transmission device 22, the other of the brake control device 12 and the transmission device 22 is configured to send a response signal. When there is no response from the other after a predetermined time period has elapsed since the one transmitted the signal, the one may determine that a communication failure has occurred. In this case, the one may generate a communication failure signal S3 that indicates that the communication failure has occurred. The communication failure signal S3 is output to the brake control devices 11, 13 through the transmission device 20.

The motor control device 62 causes the motor 102b to operate in accordance with a signal supplied from the operation apparatus 105 through the transmission device 22. The motor 102b imparts a motive power to drive the wheel 102a when the acceleration command signal is output by the operation apparatus 105. The motor 102b generates a regenerative electric power by being driven by the wheel 102a when the deceleration command signal S1 is output by the operation apparatus 105. The regenerative electric power may be supplied to, for example, other train of railroad cars through the overhead line 106. The upper limit of the regenerative electric power is determined depending on the number of other trains and the like. More specifically, the more trains are connected to the overhead line 106, the larger the upper limit of the regenerative electric power which the motor car 102 can supply to the overhead line 106.

The motor car 103 may have the same configuration as the motor car 102. More specifically, the motor car 103 may include the transmission device 23, the brake control device 13, a machine brake device 33, a pressure sensor 43, a motor control device 63, and the motor 103b coupled to a wheel 103a of the motor car 103.

The transmission device 23 have the same configuration as the transmission device 22, and is electrically coupled to the transmission device 22 of the adjacent car 102, the brake control device 13, and the motor control device 63.

The brake control device 13 is configured to control the mechanical brake device 33 and the motor 103b of the motor car 103.

The brake control device 13 and the mechanical brake device 33 have the same configurations as the brake control device 12 and the mechanical brake device 32 respectively. The brake control device 13 is configured to calculate a necessary braking force value BR2 that is required for braking the motor car 103 based on a commanded deceleration amount indicated by the deceleration command signal S1 and a pressure detection signal P3 from the pressure sensor 43. The pressure sensor 43 may be connected to an air spring (not shown) of the motor car 103 to output the pressure detection signal P3 as a pressure value corresponding to the weight of the motor car 103. A brake cylinder (not shown) of the mechanical brake device 33 is operated to generate a target mechanical braking force value BR3 which will be hereunder described. In this manner, a frictional resistance is imparted to the wheel 103a of the motor car 103, and braking of the motor car 103 is performed.

The communication unit of the brake control device 13 is provided for communication with the transmission device 23. The communication unit may include an input line 553b and an output line 553a. The input line 553b is configured to receive an electric signal from the transmission device 23. The output line 553a is configured to output an electric signal to the transmission device 23. When the brake control device 13 communicates with the transmission device 23, upon transmission of a signal from one of the brake control device 13 and the transmission device 23, the other of the brake control device 13 and the transmission device 23 is configured to send a response signal. When there is no response from the other after a predetermined time period has elapsed since the one transmitted the signal, the one may determine that a communication failure occurs. In this case, the one may generate a communication failure signal S3 that indicates that the communication failure has occurred. The communication failure signal S3 is output to the brake control devices 11, 12 through the transmission device 20.

The motor control device 63 causes the motor 103b to operate in accordance with a command signal supplied from the operation apparatus 105 through the transmission device 23. The motor 103b imparts a motive power to drive the wheel 103a when the acceleration command signal is output by the operation apparatus 105. The motor 102b generates a regenerative electric power by being driven by the wheel 103a when the deceleration command signal S1 is output by the operation apparatus 105. In the same manner as the regenerative electric power from the motor 102b, the regenerative electric power may be supplied to, for example, other train of railroad cars through the overhead line 106.

The general configuration of the train 100 of railroad cars has been described.

Operation of Brake System 1

Next, an operation of the brake system 1 will be described. More specifically, a normal operation of the brake system 1 and an operation of the brake system 1 at a time of failure occurrence will be described.

Normal Operation of Brake System 1

Figure 4:
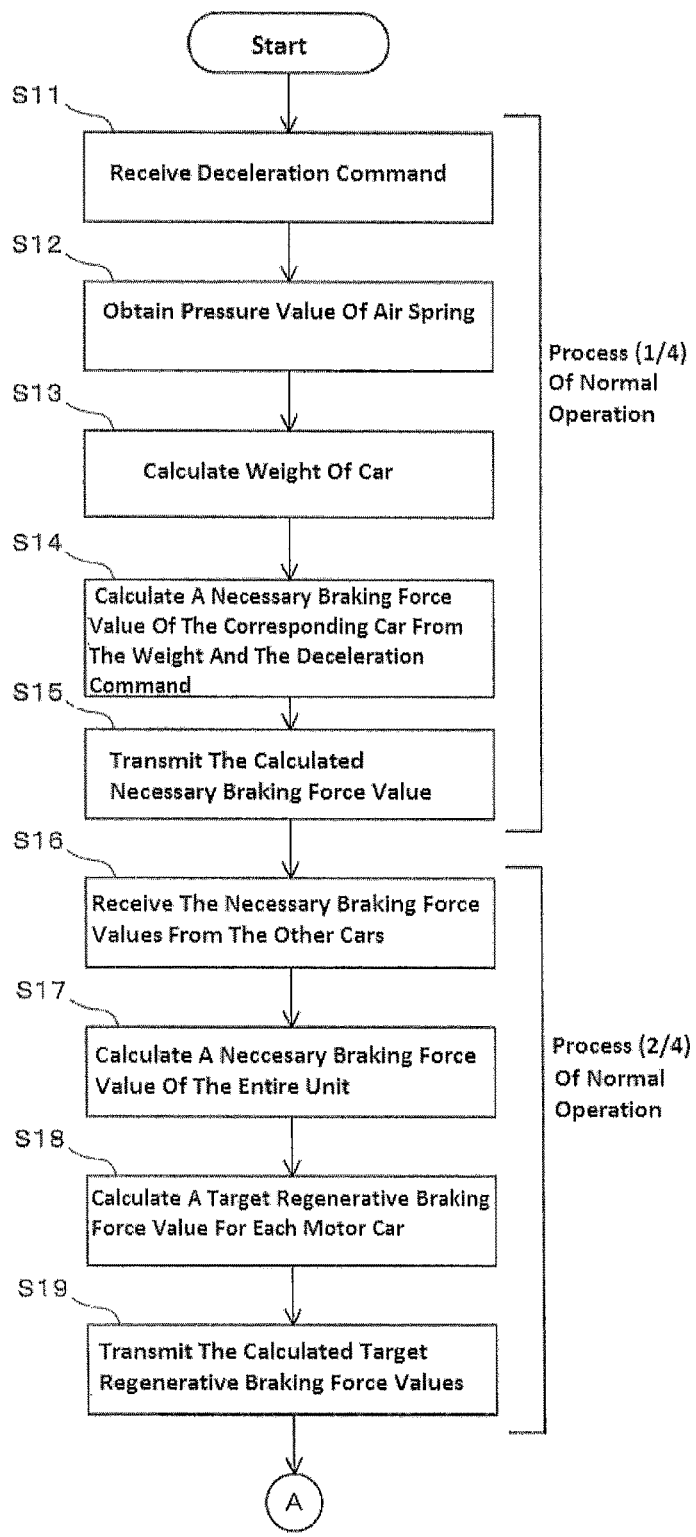
FIG. 4 is a flow diagram illustrating processes (1/4)-(2/4) of a normal operation of a brake system.
Figure 5:
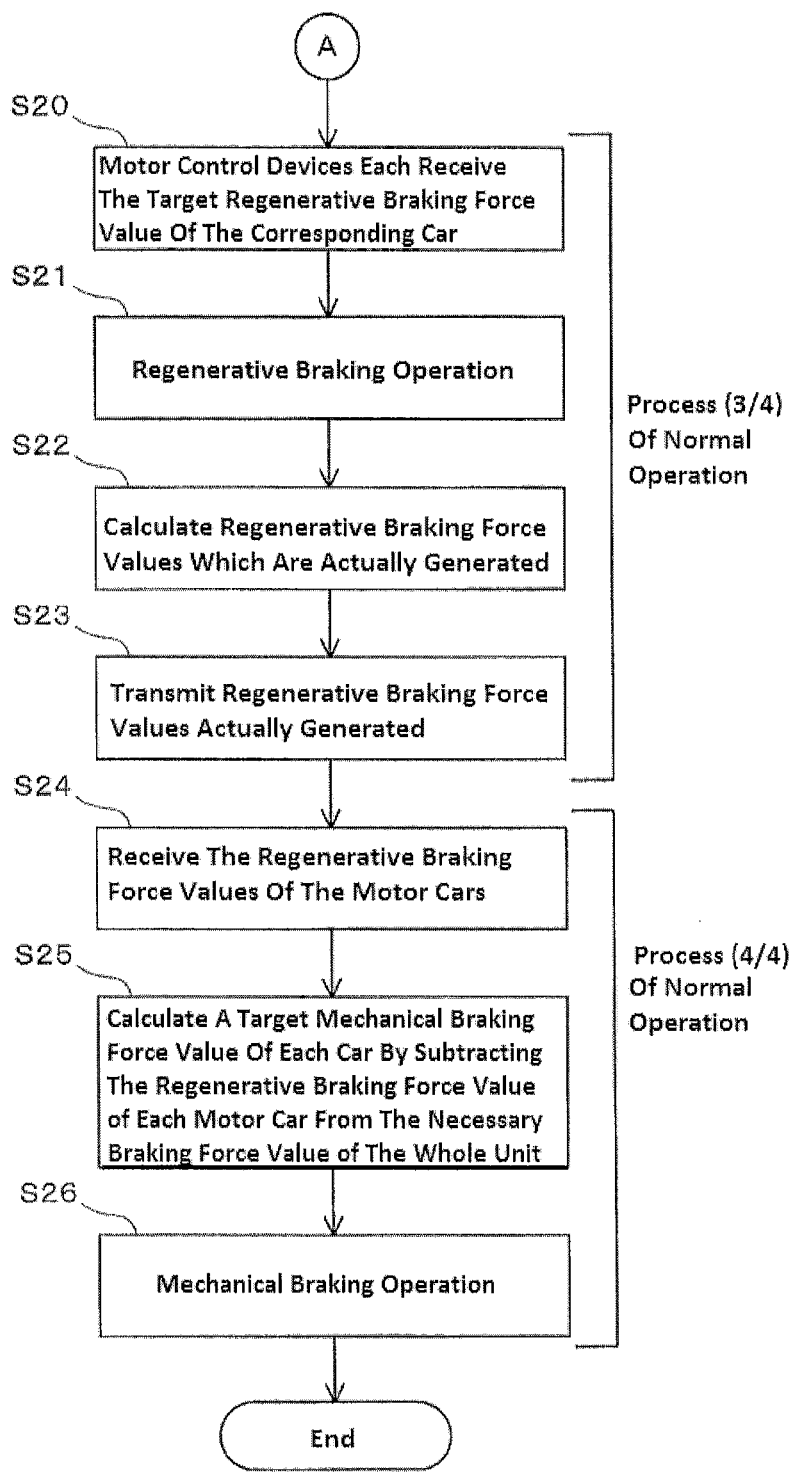
FIG. 5 is a flow diagram illustrating processes (3/4)-(4/4) of the normal operation of the brake system.
Figure 6:
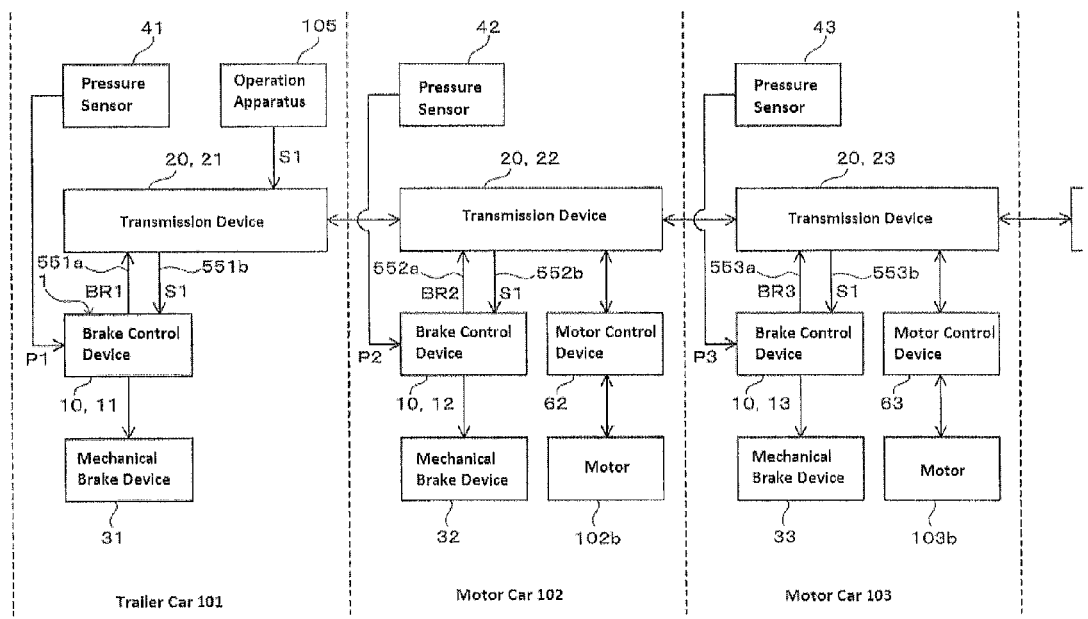
FIG. 6 is a flow diagram illustrating the process (1/4) of the normal operation of the brake system.

The brake system 1 may normally perform the following processes (1/4)-(4/4). FIG. 4 is a flow diagram illustrating processes (1/4)-(2/4) in the normal operation of the brake system 1. FIG. 5 is a flow diagram illustrating processes (3/4)-(4/4) in the normal operation of the brake system 1. FIG. 6 is a flow diagram illustrating the process (1/4) of the normal operation of the brake system 1.

Referring to FIGS. 4 and 6, in this embodiment, the brake control devices 11, 12, 13 may calculate the necessary braking force values BR1, BR2, BR3 that are required for braking the cars 101, 102, 103, respectively, in response to reception of the deceleration command signal S1. The brake control devices 11, 12, 13 may output the calculated necessary braking force values BR1, BR2, BR3 respectively to the transmission device 20.

More specifically, when the deceleration command signal S1 is generated from the operation apparatus 105 by an operator of the train, the deceleration command signal S1 is output to each of the brake control devices 11, 12, 13 through the transmission device 20. In this way, each of the brake control devices 11, 12, 13 receives the deceleration command signal S1 (step S11).

The brake control devices 11, 12, 13 that received the deceleration command signal S1 obtain the pressure detection signals P1 to P3 of the corresponding cars (the trailer car 101, the motor cars 102, 103 respectively) from the pressure sensors 41, 42, 43 respectively (step S12).

The brake control devices 11, 12, 13 calculate weights W101, W102, W103 of the cars 101, 102, 103 equipped with the brake control devices 11, 12, 13, respectively, based on the pressure detection signals P1-P3 (step S13). The brake control devices 11, 12, 13 calculate the necessary braking force values BR1, BR2, BR3 of the corresponding cars 101, 102, 103 respectively based on the weights W101, W102, W103 and the deceleration specified by the deceleration command signal S1 (step S14).

The brake control devices 11, 12, 13 may output the calculated necessary braking force values BR1, BR2, BR3 respectively to the transmission devices 20 (step S15). The process (1) of the normal operation of the brake system 1 has been described.

Figure 7:
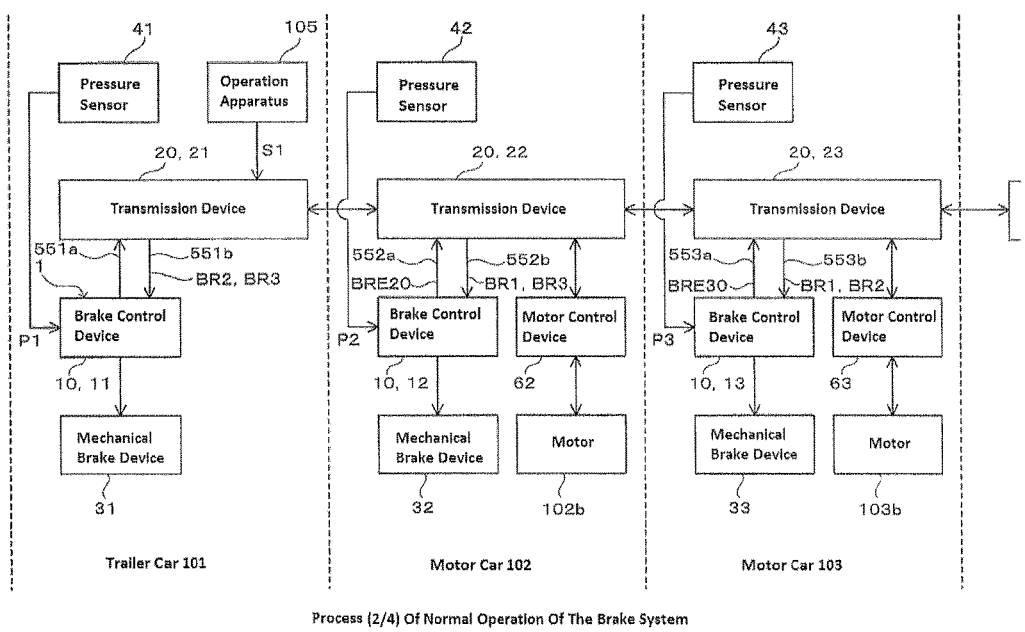
FIG. 7 is a flow diagram illustrating the process (2/4) of the normal operation of the brake system.

FIG. 7 is a block diagram illustrating the process (2/4) of the normal operation of the brake system 1. Referring to FIGS. 4 and 7, in the process (2/4) of the normal operation of the brake system 1, the brake control devices 11, 12, 13 may calculate the total necessary braking force value BRA (=BR1+BR2+BR3) by adding the necessary braking force value (one of BR1, BR2, BR3) of the corresponding cars 101, 102, 103 respectively to the necessary braking force values (other two of BR1, BR2, BR3) calculated by other brake control device 10. More specifically, the braking force values BR1, BR2, BR3 are received through the transmission devices 20 by the brake control devices 11, 12, 13, respectively. In this way, the brake control devices 11, 12, 13 receive the necessary braking force values (other two of BR1, BR2, BR3) of the cars other than the corresponding car 101, 102, 103 (step S16).

The brake control devices 11, 12, 13 then add the necessary braking force values BR1, BR2 and BR3 of the cars 101, 102, 103 in the unit 104 to obtain the total necessary braking force value BRA (step S17).

The brake control device 12, 13 may calculate target regenerative braking force values BRE20, BRE30 to be generated by the motors 102b, 103b of the corresponding cars 102, 103 based on the total necessary braking force value BRA (step S18). As a distribution between the target regenerative braking force values BRE20 and BRE30, a predetermined ratio (for example, fifty-fifty) can be set. Alternatively a ratio which can be dynamically changed such as the weight ratio of the motor cars 102, 103, a ratio between the necessary braking force values BR20 and BR30, or the like can be set as the distribution between the target regenerative braking force values BRE20 and BRE30.

The brake control devices 12, 13 may output the calculated target regenerative braking force values BRE20, BRE30 respectively to the transmission device 20 (step S19).

Figure 8:
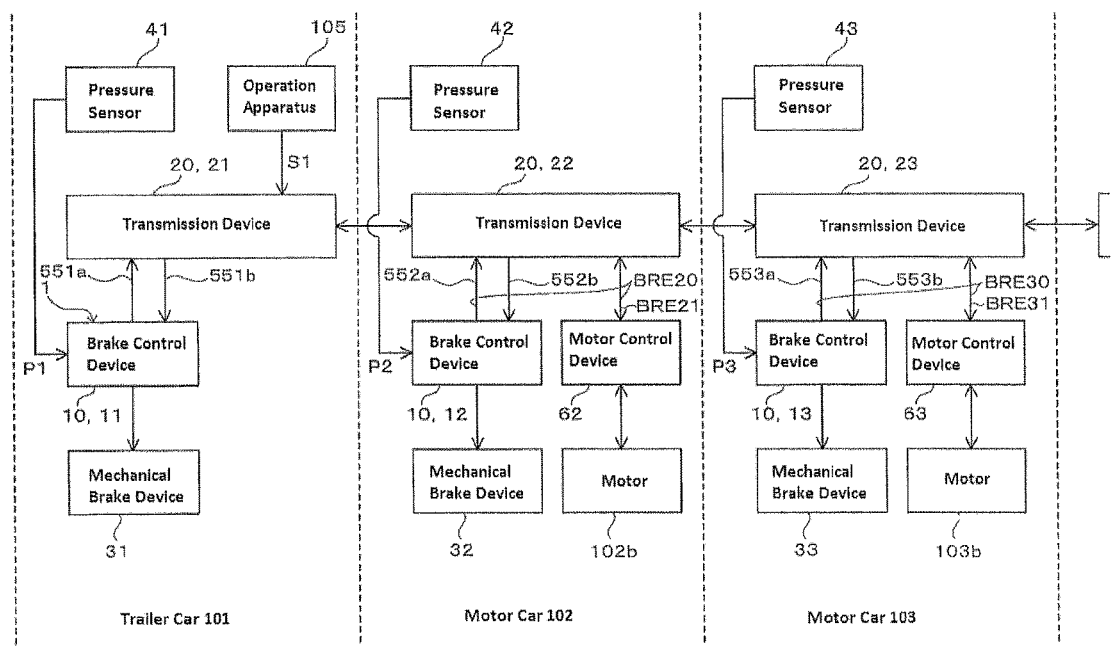
FIG. 8 is a flow diagram illustrating the process (3/4) of the normal operation of the brake system.

FIG. 8 is a block diagram illustrating the process (3/4) of the normal operation of the brake system 1. Referring to FIGS. 5 and 8, the motor control devices 62, 63 receive the target regenerative braking force values BRE20 and BRE30 respectively (step S20). The motor control devices 62, 63 cause the motors 102b, 103b to perform regenerative braking operations that generate the corresponding target regenerative braking force values BRE20, BRE30 by controlling the motors 102b, 103b respectively (step S21).

The brake control devices 12, 13 may then calculate effective regenerative braking force values (regenerative braking force values BRE21, BRE31) which are actually generated from the electric currents and voltages generated in the motors 102b, 103b (step S22). The brake control devices 12, 13 may output the calculated regenerative braking force values BRE21, BRE31 respectively to the transmission device 20 (step S23). The process (3/4) of the normal operation of the brake system 1 has been described.

Figure 9:
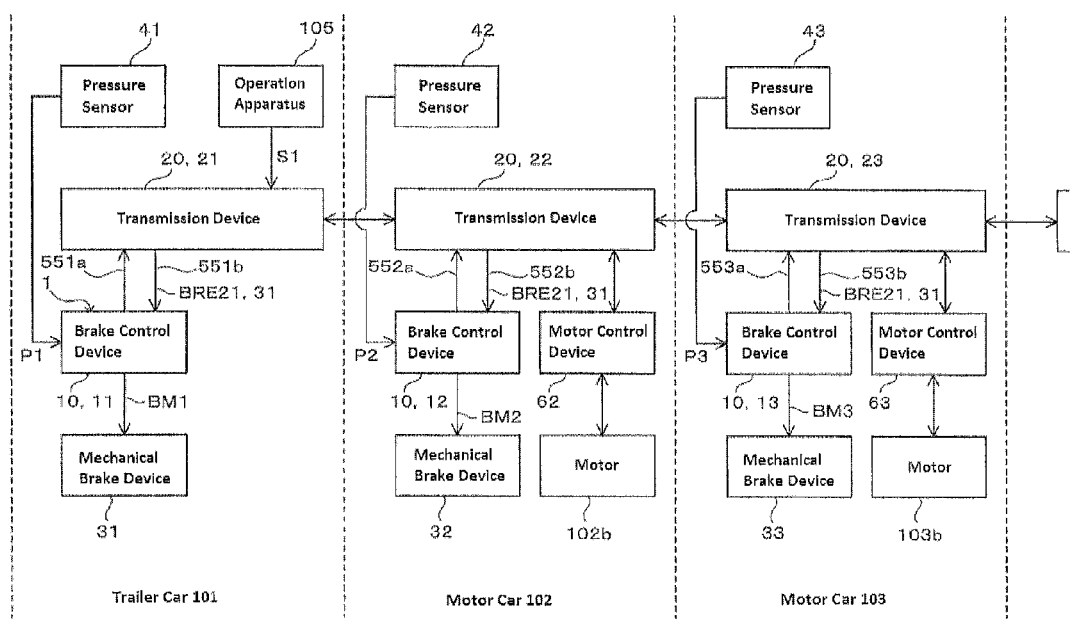
FIG. 9 is a flow diagram illustrating the process (4/4) of the normal operation of the brake system.

FIG. 9 is a block diagram illustrating the process (4/4) of the normal operation of the brake system 1. Referring to FIGS. 5 and 9, in the process (4/4) of the normal operation of the brake system 1, the brake control devices 11, 12, 13 may calculate target mechanical braking force values BM1, BM2, BM3 to be generated by the mechanical brake device 31, 32, 33 of the corresponding cars 101, 102, 103 by subtracting the effective regenerative braking force values BRE21, BRE31 actually generated in the motor cars 102, 103 from the total necessary braking force value BRA.

More specifically, the brake control devices 11, 12, 13 receive the regenerative braking force values BRE21, BRE31 of the motor cars 102, 103 (step S24). The brake control devices 11, 12, 13 then calculate the target mechanical braking force values BM1, BM2, BM3, respectively, which the mechanical brake devices 31, 32, 33 in the cars 101, 102, 103 should generate. More specifically, the brake control devices 11, 12, 13 subtract the combined regenerative braking force values (BRE21+BRE31) in the unit 104 from the total necessary braking force value BRA.

In this way, the sum of the target mechanical braking force values BM1, BM2, BM3 in the unit 104 can be obtained. The brake control devices 11, 12, 13 calculate the target mechanical braking force values BM1, BM2, BM3 respectively based on the sum of the target mechanical braking force values BM1, BM2, BM3 (step S25). In this case, each of the target mechanical braking force values BM1, BM2, BM3 may be set as an equal value or may be set in accordance with the weight of the corresponding car 101, 102, 103 by the corresponding brake control device 11.

The brake control devices 11, 12, 13 then cause the corresponding mechanical brake devices 31, 32, 33 to operate such that they generate the target mechanical braking force values BM1, BM2, BM3 respectively (step S26).

The normal operation of the brake system 1 has been described.

Operation of Brake System 1 at the Time of Failures

Next, an operation of the brake system 1 at the time when a failure occurs will be described. More specifically, operations (a) when a failure in transmission from the brake control device 11 to the transmission device 21 occurs in the trailer car 101, (b) when a failure in transmission from the brake control device 12 to the transmission device 22 occurs in the motor car 102, (c) when a failure in transmission from the transmission device 21 to the brake control device 11 occurs in the trailer car 101, and (d) when a failure in transmission from the brake control device 12 to the transmission device 22 occurs in the motor car 102, will be hereunder described.

(a) An Operation of the Brake System 1 when a Failure in Transmission from the Brake Control Device 11 to the Transmission Device 21 occurs in the Trailer Car 101

Figure 10:
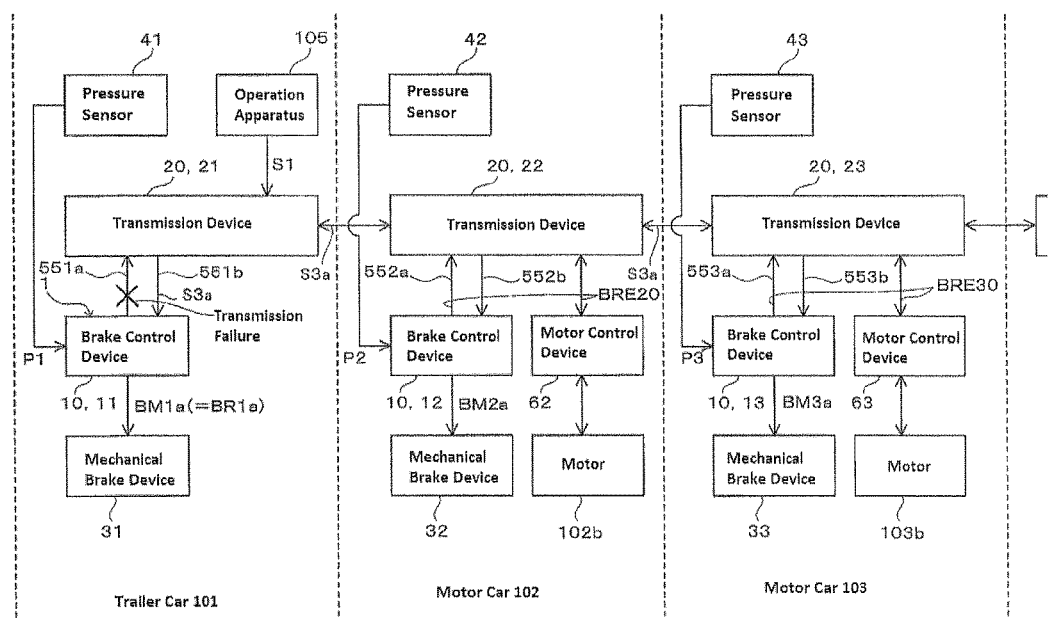
FIG. 10 is a block diagram illustrating an example of an operation of the brake system (a) when a failure of transmission from a brake control device to a transmission device in a trailer car occurs.
Figure 11:
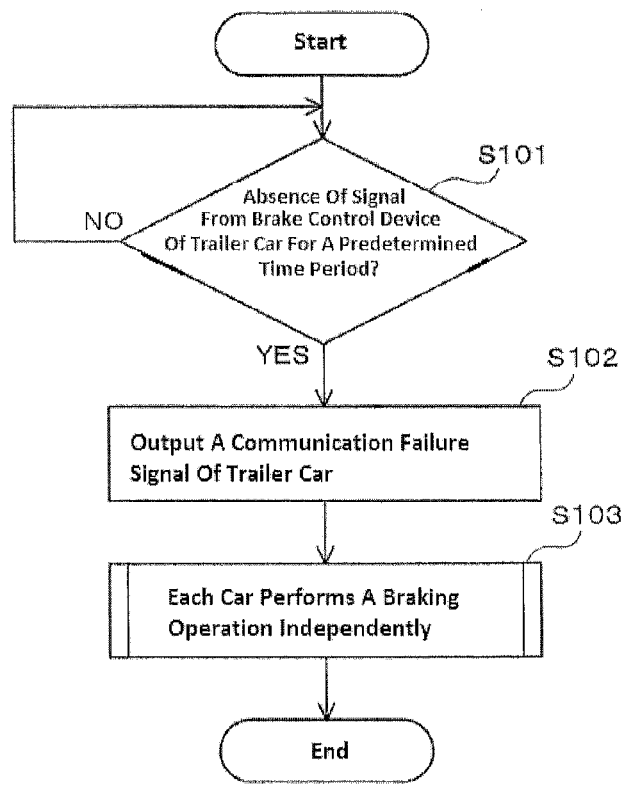
FIG. 11 is a flow diagram illustrating the example of the operation of the brake system (a) when a failure of transmission from the brake control device to the transmission device in the trailer car occurs.

FIG. 10 is a flow diagram illustrating the example of the operation of the brake system 1 (a) when a failure of transmission from the brake control device 11 to the transmission device 21 in the trailer 101 car occurs. FIG. 11 is a flow diagram illustrating the example of the operation of the brake system 1 (a) when a failure in transmission from the brake control device 11 to the transmission device 21 in the trailer car 101 occurs.

Referring to FIGS. 10 and 11, (a) when a failure in transmission (information cannot be communicated) from the brake control device 11 to the transmission device 21 in the trailer car 101 occurs, the brake control device 11 provided in the trailer car 101 calculates a necessary braking force value BR1a that is required for braking the trailer car 101 without using the information output from the other brake control devices 12, 13 to the transmission device 20.

In this case, the brake control device 12 provided in the motor car 102 calculates a necessary braking force value BR2a that is required for braking the motor car 102 without using the information output from the other brake control devices 11, 13 to the transmission device 20. In the same manner, the brake control device 13 provided in the motor car 103 calculates a necessary braking force value BR3a that is required for braking the motor car 103 without using the information output from the other brake control devices 11, 12 to the transmission device 20. This operation will be hereunder described in detail.

When the transmission device 21 does not receive a signal from the brake control device 11 in the trailer car 101 for a predetermined time period (YES in step S101), the transmission device 21 may output a communication failure signal S3a indicating a communication failure in the trailer car 101 to other transmission devices 22, 23 and the brake control device 11 (step S102). In this case, the cars 101, 102, 103 of the unit 104 respectively perform a braking operation independently (step S103).

Figure 12:
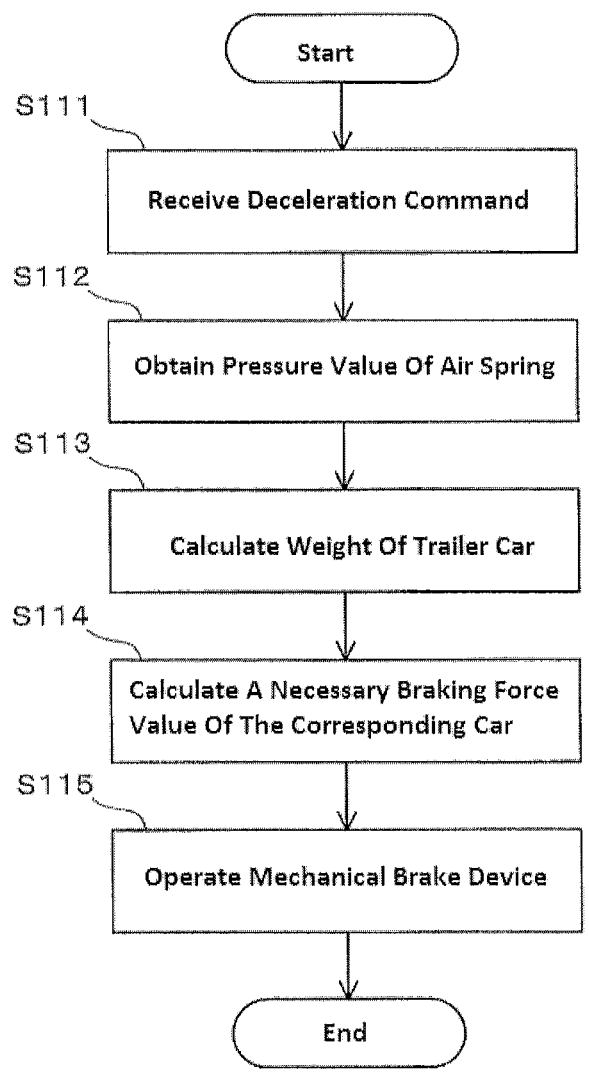
FIG. 12 is a flow diagram illustrating an example of a process performed (a-1) when the trailer car independently performs a braking operation.

FIG. 12 is a flow diagram illustrating an example of a process performed (a-1) when the trailer car 101 performs a braking operation on its own. Referring to FIGS. 10 and 12, in the step S103, the brake control device 11 in the trailer car 101 receives the deceleration command signal S1 from the operation apparatus 105 (step S111). The brake control device 11 also obtains the pressure detection signal P1 from the pressure sensor 41 (step S112). The brake control device 11 calculates the weight W101 of the trailer car 101 from the pressure detection signal P1 (step S113) and then estimates the necessary braking force value BR1$a$ of the trailer car 101 (step S114). The brake control device 11 may cause the mechanical brake device 31 to generate the necessary braking force value BR1$a$ (in other words, a target mechanical braking force value BM1$a$) (step S115).

Figure 13:
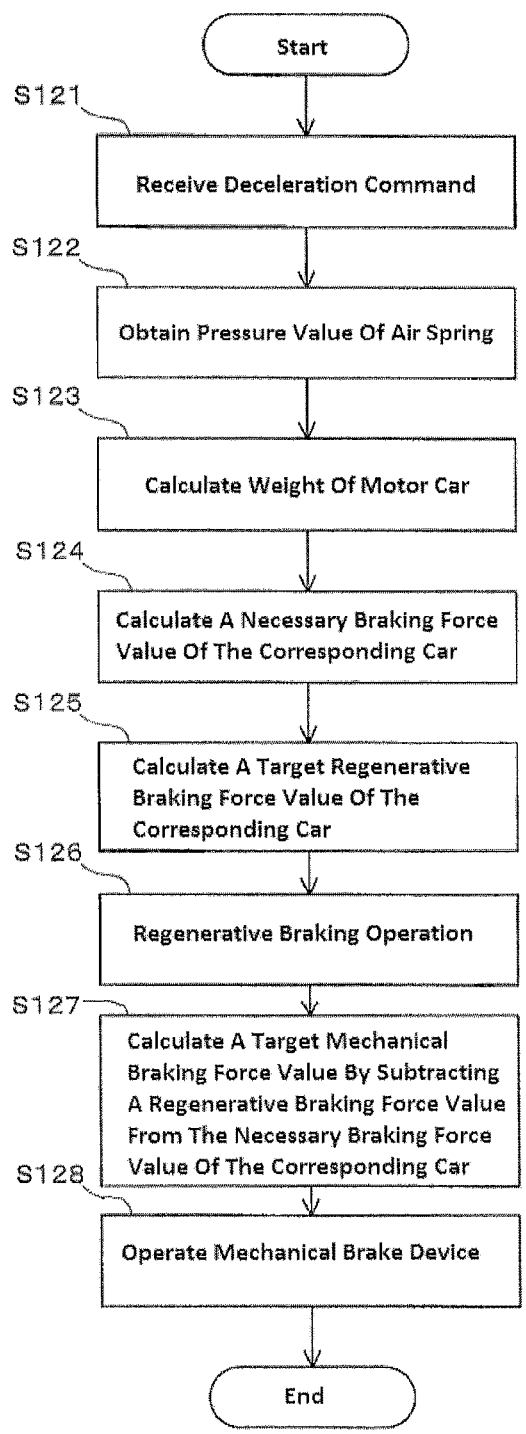
FIG. 13 is a flow diagram illustrating an example of a process performed (a-2) when motor cars independently performs a braking operation.

FIG. 13 is a flow diagram illustrating an example of a process performed (a-2) when the motor car 102 independently performs a braking operation. Referring to FIGS. 10 and 13, in the step S103, the brake control device 12 in the motor car 102 receives the deceleration command signal S1 from the operation apparatus 105 (step S121), and obtains the pressure detection signal P2 from the pressure sensor 42 (step S122). The brake control device 12 calculates the weight W102 of the motor car 102 from the pressure detection signal P2 (step S123). The brake control device 12 then estimates the necessary braking force value BR2$a$ of the motor car 102 (step S124).

The brake control device 12 then estimates a target regenerative braking force value BRE20$a$ based on the necessary braking force value BR2$a$ (step S125). Subsequently the brake control device 12 generates a command signal to generate the target regenerative braking force value BRE20$a$ and outputs it to the motor control device 62. The motor control device 62 controls the motor 102$b$ such that the target regenerative braking force value BRE20$a$ is generated (step S126).

The brake control device 12 then estimates a target mechanical braking force value BM2$a$ by subtracting the regenerative braking force value BRE20$a$ actually generated in the motor 102$b$ from the necessary braking force value BR2$a$ of the motor car 102 (step S127). The brake control device 12 may cause the mechanical brake device 32 to operate such that it generates a mechanical braking force corresponding to the target mechanical braking force value BM2$a$ (step S128). The same operation as the motor car 102 is performed in the motor car 103 so that the description of the operation in the motor car 103 will be omitted.

Figure 14:
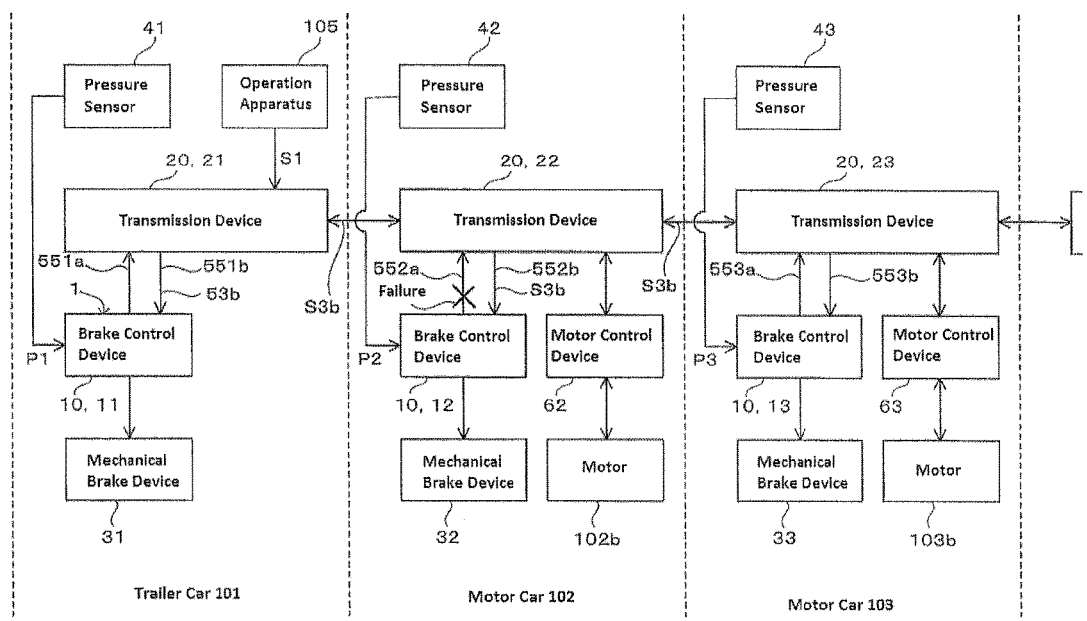
FIG. 14 is a block diagram illustrating an example of an operation of the brake system (b) when a failure of transmission from a brake control device to a transmission device in a motor car occurs.
Figure 15:
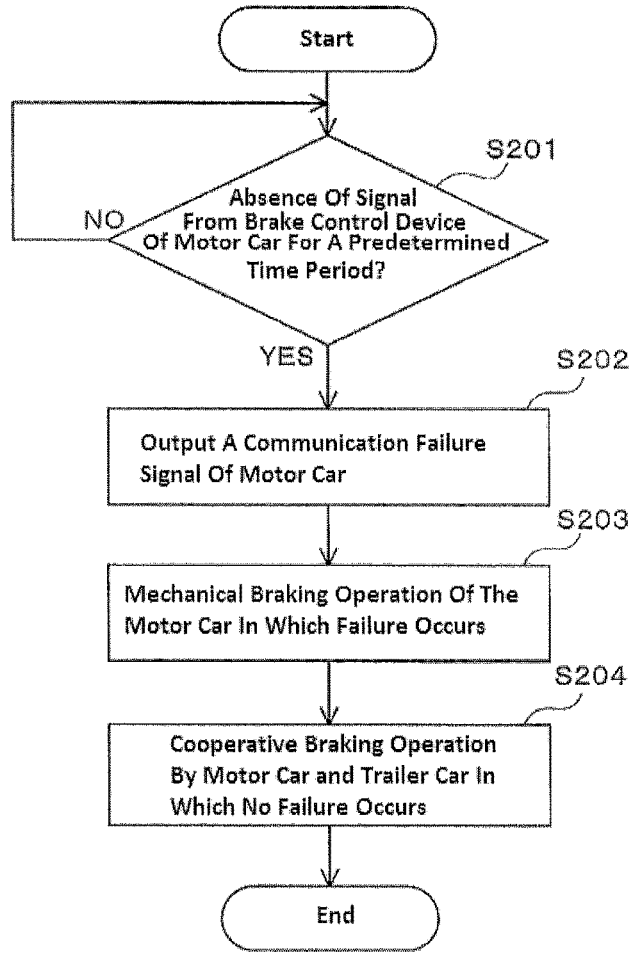
FIG. 15 is a flow diagram illustrating an example of the operation of the brake system (b) when a failure of transmission from the brake control device to the transmission device in the motor car occurs.

(b) An Operation of the Brake System 1 when a Failure of Transmission from the Brake Control Device 12 to the Transmission Device 22 in the Motor Car 102 Occurs FIG. 14 is a block diagram illustrating an example of an operation of the brake system 1 (b) when a failure of transmission from the brake control device 12 to the transmission device 22 in the motor car 102 occurs. FIG. 15 is a flow diagram illustrating the example of the operation of the brake system 1 (b) when a failure of transmission from the brake control device 12 to the transmission device 22 in the motor car 102 occurs.

(b) When a failure in transmission (information cannot be communicated) from the brake control device 12 to the transmission device 21 in the motor car 102 occurs, the brake control device 12 calculates a necessary braking force value BR2$b$ that is required for braking the motor car 102 without using the information output from the other brake control devices 11, 13 to the transmission device 20. This operation will be hereunder described in detail.

Referring to FIGS. 14 and 15, when the transmission device 22 does not receive a signal from the brake control device 12 in the motor car 102 for a predetermined time period (YES in step S201), the transmission device 22 may output a communication failure signal S3$b$ indicating a communication failure in the motor car 102 to the other transmission devices 21, 23 and the brake control device 12 (step S202). In this case, the motor car 102 in which the failure occurs independently performs a mechanical braking operation using the mechanical brake device 32 (step S203).

More specifically, the motor car 102 performs the same operation as the braking operation which the trailer car 101 independently performs as shown in (a-1) of FIG. 12 (steps S111-S115). In this case, the brake control device 12 estimates the necessary braking force value BR2$b$ of the motor car 102 based on the deceleration command signal S1 and the pressure detection signal P2 from the pressure sensor 42. The brake control device 12 may cause the mechanical brake device 32 to operate such that it generates a target mechanical braking force value BM2$b$ corresponding to the necessary braking force value BR2.

The motor car 103 and the trailer car 101 in which a failure does not occur may cooperate to perform a braking operation (step S204). More specifically, the same operation as the normal operation of the brake system 1 described above (steps S11-S26) with reference to FIGS. 4 and 5 is performed without the motor car 102. In this case, the brake control devices 11, 13 calculate a total necessary braking force value BRAb that is required to put a brake on the entire cars 21, 23 in the unit 104, except the motor car 102.

The operation of the brake system 1 when a failure of transmission from the brake control device 13 to the transmission device 23 in the motor car 103 occurs will not be described since it is same as the operation (b) described above.

Figure 16:
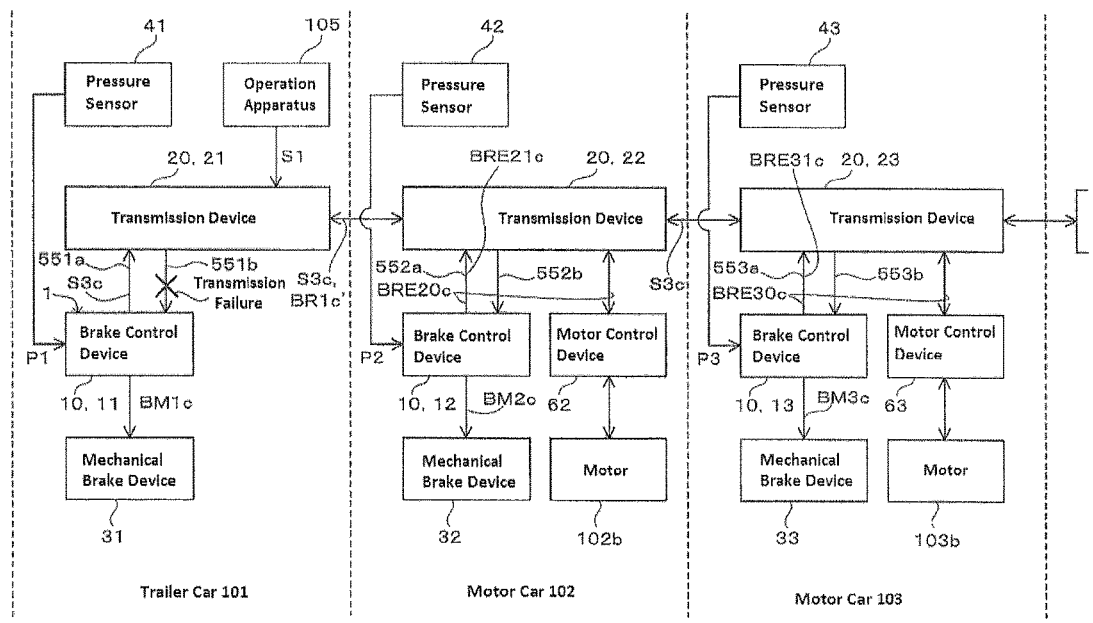
FIG. 16 is a block diagram illustrating an example of an operation of the brake system when a failure of transmission from the transmission device to the brake control device in the trailer car occurs.
Figure 17:
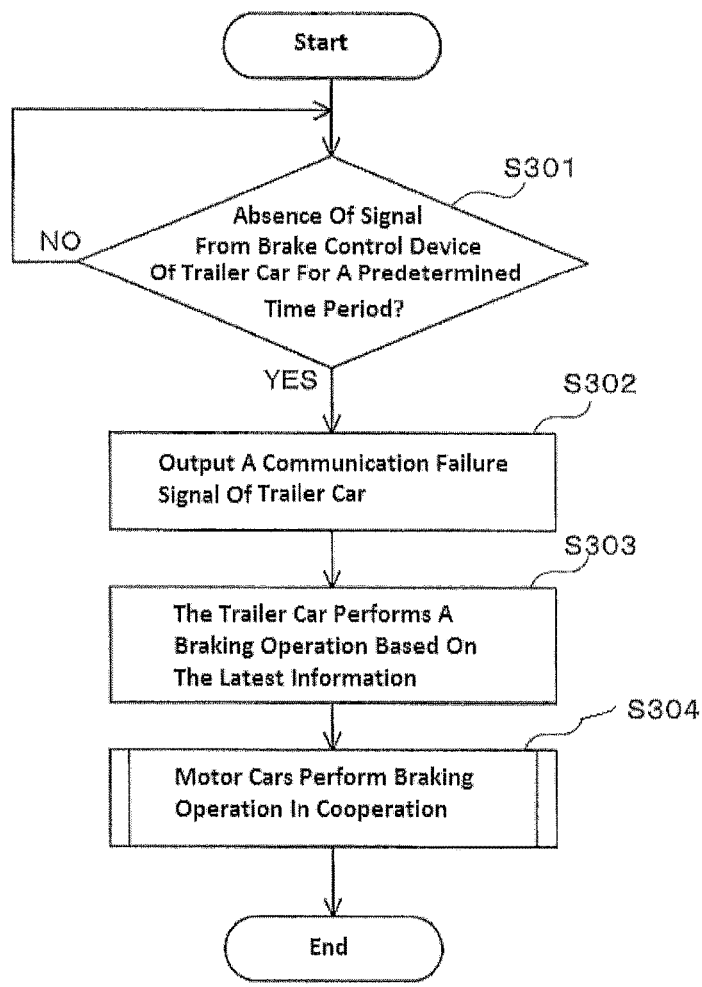
FIG. 17 is a block diagram illustrating an example of an operation of the brake system (c) when a failure of transmission from the transmission device to the brake control device in the trailer car occurs.

(c) An Operation of the Brake System 1 when a Failure of Transmission from the Transmission Device 21 to the Brake Control Device 11 in the Trailer Car 101 Occurs FIG. 16 is a block diagram illustrating an example of the operation of the brake system when a failure of transmission from the transmission device 21 to the brake control device 11 in the trailer car 101 occurs. FIG. 17 is a flow diagram illustrating the example of the operation of the brake system (c) when a failure of transmission from the transmission device 21 to the brake control device 11 in the trailer car 101 occurs.

Referring to FIGS. 16 and 17, (c) when a failure in transmission (information cannot be communicated) from the transmission device 21 to the brake control device 11 in the trailer car 101 occurs, the brake control device 11 calculates a necessary braking force value BR1$c$ that is required to put a brake on the trailer car 101 without using the information output from the other brake control devices 12, 13 to the transmission device 20. This operation will be hereunder described in detail.

When the brake control device 11 does not receive a signal from the transmission device 21 in the trailer car 101 for a predetermined time period (YES in step S301), the brake control device 11 may output a communication failure signal S3$c$ indicating a communication failure in the trailer car 101 to the transmission devices 21, 22, 23 (step S302). In this case, the brake control device 11 in the trailer car 101 independently performs the braking operation based on the deceleration command signal S1 at the time of the information transmission failure (step S303). The same operation as that of steps S112-S115 shown in (a-1) of FIG. 12 may be then performed in the trailer car 101, and the necessary braking force value BR1c or a target mechanical braking force value BM1c that is required for braking the trailer car 101 may be calculated. If the brake control device 11 had not received the deceleration command signal S1 at the time of the information transmission failure, it may set the deceleration to zero. In other words, the brake control device 11 may not perform the deceleration operation. Whereas the motor cars 102, 103 may perform the braking operation in cooperation (step S304).

Figure 18:
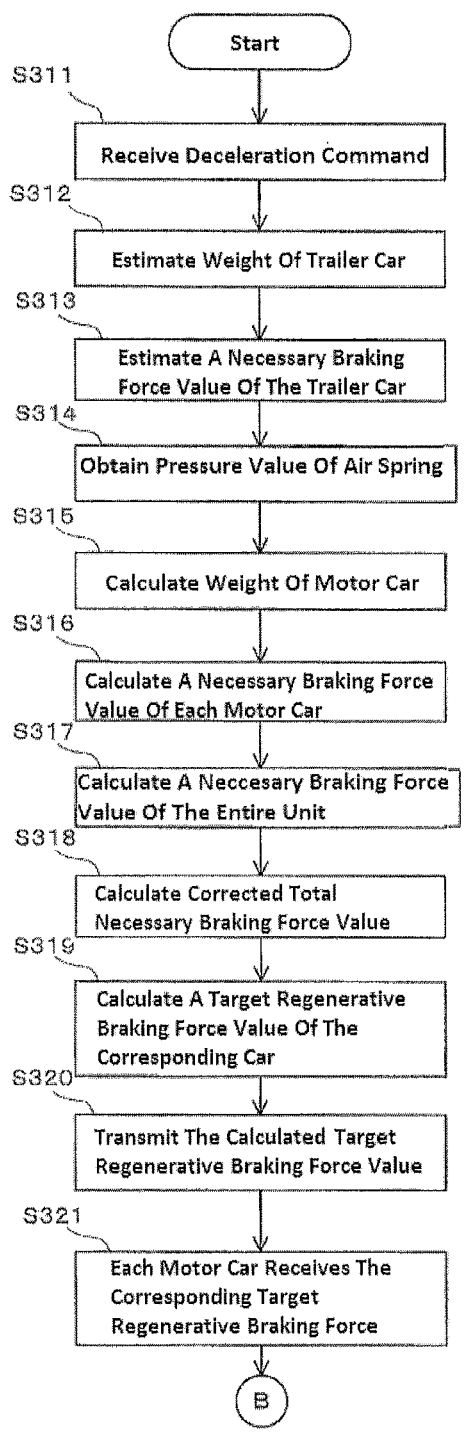
FIG. 18 is a flow diagram illustrating the example of the process performed (c-1) when the motor cars in cooperation perform the braking operation.
Figure 19:
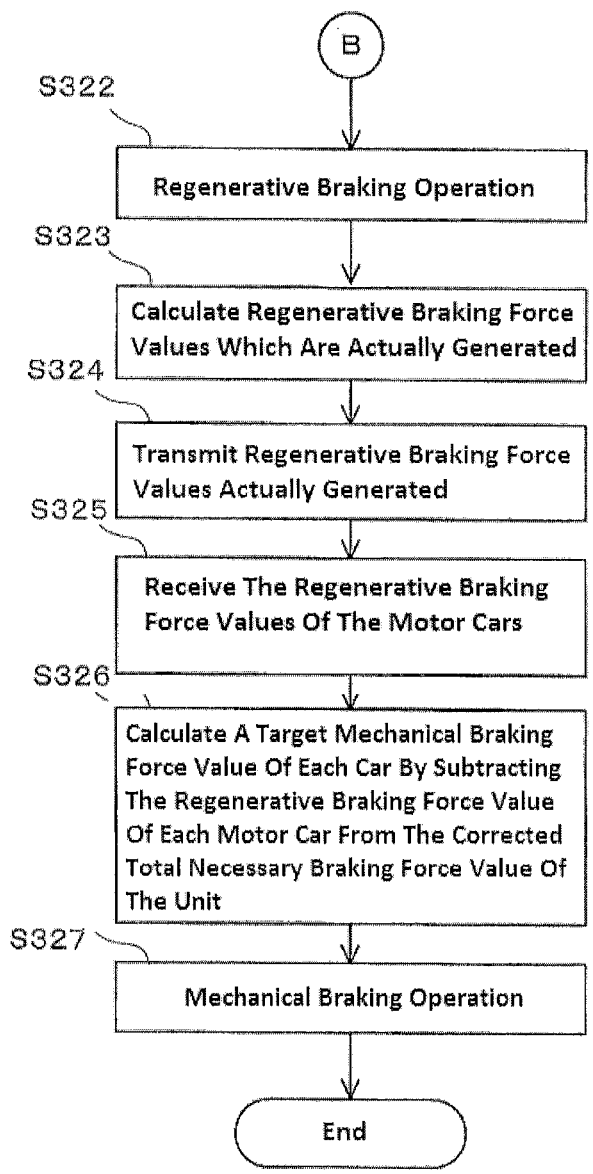
FIG. 19 is a flow diagram illustrating the example of the process performed (c-1) when the motor cars in cooperation perform the braking operation.

FIGS. 18 and 19 are flow diagrams illustrating an example of a process performed (c-1) when the motor cars 102, 103 in cooperation perform the braking operation. Referring to FIGS. 16, 18, 19, the brake control devices 12, 13 in the motor cars 102, 103, except for the brake control device in the trailer car 101 in which the transmission failure occurs, may calculate a necessary braking force value BR2c+BR3c that is required for braking the motor cars 102, 103 in which the brake control devices 12, 13 are provided respectively. The brake control devices 12, 13 may also calculate a total necessary braking force value BRAc (=BR1c+BR2c+BR3c) that is required for the cars 101, 102, 103 in the entire unit 104 by estimating the necessary braking force value BR1c that is required for braking the trailer 101.

More specifically, when the brake control devices 12, 13 receive the deceleration command signal S1 from the operation apparatus 105 (step S311), the brake control devices 12, 13 firstly calculate (estimate) the weight of the trailer car 101 (step S312). The brake control devices 12, 13 calculates the weight W101 of the trailer car 101 based on a necessary braking force BR1c' that is the latest available before the communication failure occurs in the trailer 101 and the deceleration command signal S1 at the time (step S312).

The brake control devices 12, 13 then calculate (estimate) the necessary braking force value BR1c of the trailer car 101 based on the weight W101 of the trailer car 101 and a deceleration specified by the latest deceleration command signal S1 (step S313). The brake control devices 12, 13 in the motor cars 102, 103 then obtain the pressure detection signals P2, P3 of the cars 102, 103 respectively from the corresponding pressure sensors 42, 43 (step S314).

The brake control devices 12, 13 calculate the weights W102, W103 of the motor cars 102, 103 from the pressure detection signals P2, P3 (step S315). The brake control devices 12, 13 calculate a necessary braking force values (the necessary braking force values BR2c, BR3c) for the cars 102, 103 based on the weights W102, W103 and the deceleration specified by the deceleration command signal S1 (step S316).

The brake control devices 12, 13 then calculate the total necessary braking force value BRAc that is required for the entire unit 104 by adding the necessary braking force values BR2c, BR3c of the motor cars 102, 103 to the estimated necessary braking force value BR1c of the trailer car 101 (step S317). The brake control devices 12, 13 then calculate a corrected total necessary braking force value BRAc' by subtracting the target mechanical braking force value BM1c (the necessary braking force value BR1c) generated in the trailer car 101 from the total necessary braking force value BRAc (step S318).

The brake control devices 12, 13 may then estimate target regenerative braking force values BRE20c, BRE30c which the cars 102, 103 bear respectively (step S319). As a distribution between the target regenerative braking force values BRE20c and BRE30c, a predetermined ratio (for example, fifty-fifty) can be set. Alternatively a ratio which can be dynamically changed such as the weight ratio of the motor cars 102, 103, a ratio between the necessary braking force values BR2c and BR3c, or the like can be set as the distribution between the target regenerative braking force values BRE20c and BRE30c.

The brake control devices 12, 13 may output the target regenerative braking force values BRE20c, BRE30c of the cars 102, 103, respectively, to the transmission device 20 (step S320).

The motor control devices 62, 63 may then estimate target regenerative braking force values BRE20c, BRE30c which the brake control devices 12, 13 calculate respectively (step S321). The motor control devices 62, 63 cause the motors 102b, 103b to perform regenerative braking operations that generate the corresponding target regenerative braking force values BRE20c, BRE30c by controlling the motors 102b, 103b respectively (step S322). The brake control devices 12, 13 may then calculate effective regenerative braking force values (regenerative braking force values BRE21c, BRE31c) which are actually generated from the electric currents and voltages generated in the motors 102b, 103b (step S323). The brake control devices 12, 13 may output the calculated regenerative braking force values BRE21c, BRE31c, respectively, to the transmission device 20 (step S324).

The brake control devices 12, 13 may then receive the regenerative braking force values BRE21c, BRE31c of the motor cars 102, 103 (step S325). The brake control devices 12, 13 then calculate the target mechanical braking force values BM2c, BM3c respectively which the mechanical brake devices 31, 32 in the cars 102, 103 should generate (step S326). More specifically, the brake control devices 12, 13 respectively subtract the total regenerative braking force value (BRE21c+BRE31c) of the unit 104 from the corrected total necessary braking force value BRAc' of the unit 104 to calculate the sum of the target mechanical braking force values BM2c, BM3c. In this case, each of the target mechanical braking force values BM2c, BM3c may be set as an equal value or may be set in accordance with the weight of the corresponding car 102, 103.

The brake control devices 12, 13 then cause the corresponding mechanical brake devices 32, 33 to operate such that they generate the target mechanical braking force values BM2c, BM3c respectively (step S327).

When the transmission failure (c) described above occurs, the deceleration command signal S1 from the operation apparatus 105 is changed and the required deceleration is decreased, the change of the deceleration command signal S1 cannot be transmitted to the brake control device 11. In this case, it is considered that the mechanical brake device 31 generates a larger-than-necessary mechanical braking force. Therefore the brake control devices 12, 13 should set a necessary braking force value smaller than the usual necessary braking force value set at the time of normal operation. In this way, it is possible for the brake control devices 11, 12, 13 to generate the right amount of the braking force for the entire unit 104.

Note that, in the step S304 in FIG. 17, the motor cars 102, 103 may independently perform the braking operation instead of the process described above with reference to FIGS. 18 and 19. In this case, the motor cars 102, 103 each perform the steps S121-S128 in FIG. 13.

Figure 20:
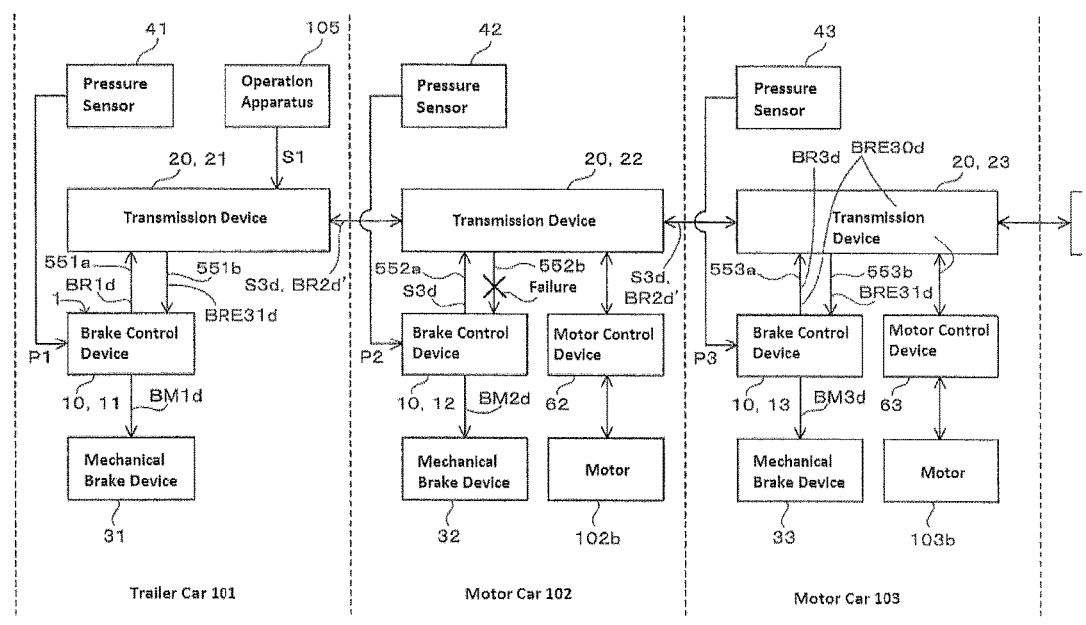
FIG. 20 is a block diagram illustrating an example of an operation of the brake system (d) when a failure of transmission from the transmission device to the brake control device in the motor car occurs.
Figure 21:
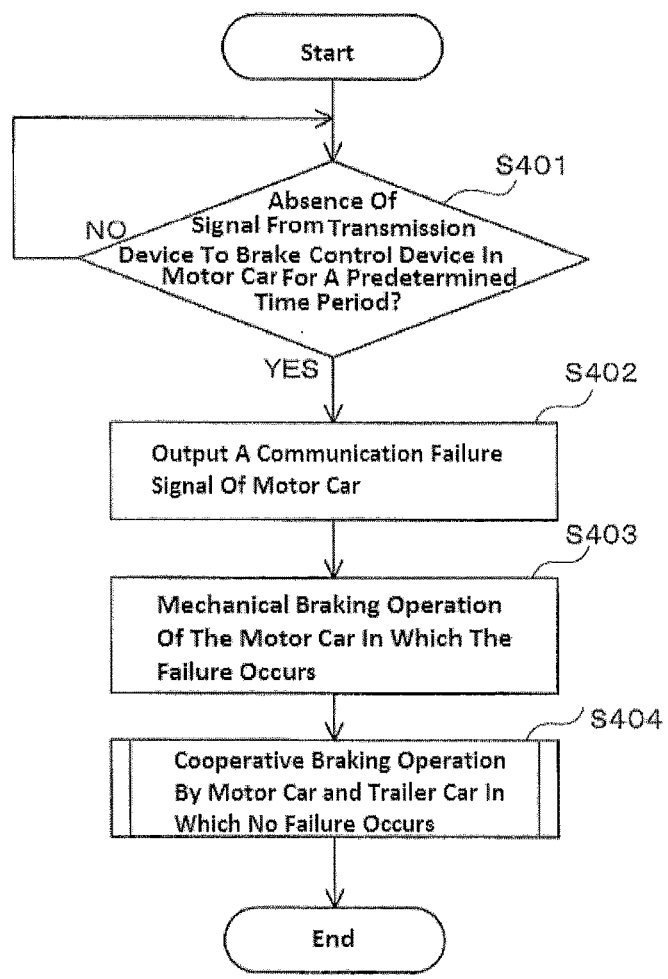
FIG. 21 is a flow diagram illustrating an example of the operation of the brake system (d) when a failure of transmission from the transmission device to the brake control device in the motor car occurs.

(d) An Operation of the Brake System 1 when a Failure of Transmission from the Transmission Device 22 to the Brake Control Device 12 in the Motor Car 102 Occurs FIG. 20 is a block diagram illustrating an example of an operation of the brake system 1 (d) when a failure of transmission from the transmission device 22 to the brake control device 12 in the motor car 102 occurs. FIG. 21 is a flow diagram illustrating the example of the operation of the brake system (d) when a failure of transmission from the transmission device 22 to the brake control device 12 in the motor car 102 occurs.

(d) When a failure in transmission (information cannot be communicated) from the transmission device 22 to the brake control device 12 in the motor car 102 occurs, the brake control device 12 calculates a necessary braking force value BR2$d$ that is required for braking the motor car 102 without using the information output from the other brake control devices 11, 13 to the transmission device 20. This operation will be hereunder described in detail.

Referring to FIGS. 20 and 21, when the brake control device 12 does not receive a signal from the transmission device 22 in the motor car 102 for a predetermined time period (YES in step S401), the brake control device 12 may output a communication failure signal S3$d$ indicating a communication failure in the motor car 102 to the transmission devices 21, 22, 23 (step S402).

In this case, the motor car 102 in which the failure occurs does not perform the regenerative braking operation but performs a braking operation independently using the mechanical brake device 32 (step S403). More specifically, the motor car 102 performs the same operation as the steps S111-S115 of (a-1) of FIG. 12. More specifically, the brake control device 12 calculates the necessary braking force value BR2$d$ of the motor car 102 based on the deceleration command signal S1 at the time when the failure of information transmission from the transmission device 20 occurs and the weight W102 of the motor car 102.

The brake control device 22 may cause the mechanical brake device 32 to operate such that it generates a target mechanical braking force value BM2$b$ corresponding to the necessary braking force value BR2$d$. If the brake control device 12 had not been provided with the deceleration command signal S1 at the time of the information communication failure, it may set the deceleration to zero. In other words, the brake control device 12 may not perform the deceleration operation. The motor car 103 and the trailer car 101 in which a failure does not occur may cooperate with each other to perform a braking operation (step S404).

Figure 22:
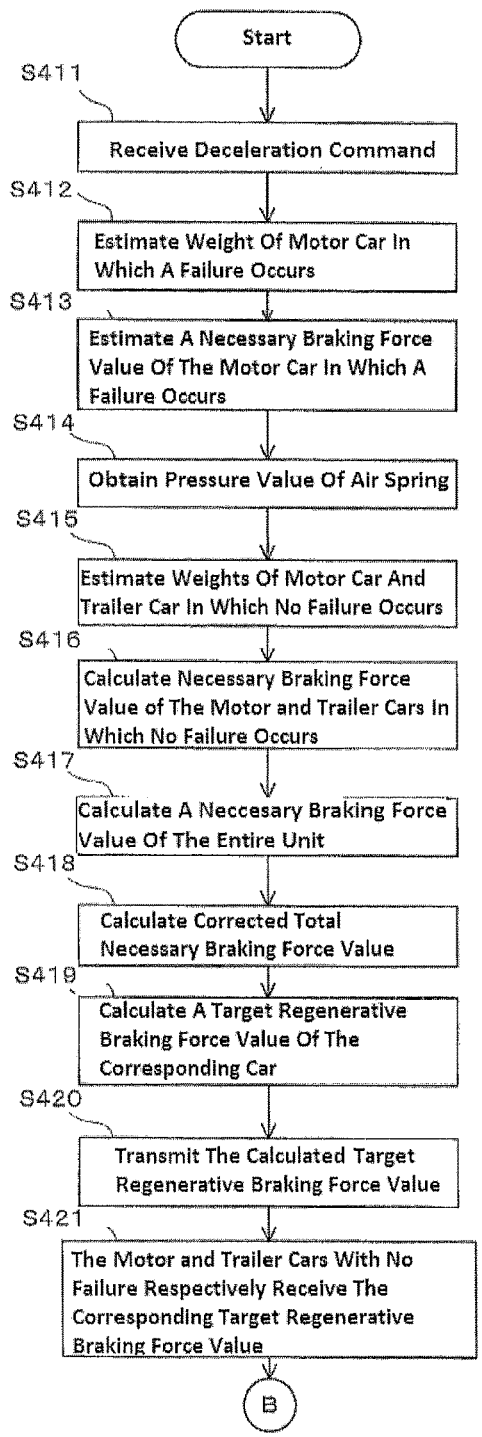
FIG. 22 is a flow diagram illustrating the example of the process performed (d-1) when the motor car and the trailer car that operate normally perform the braking operation in cooperation.
Figure 23:
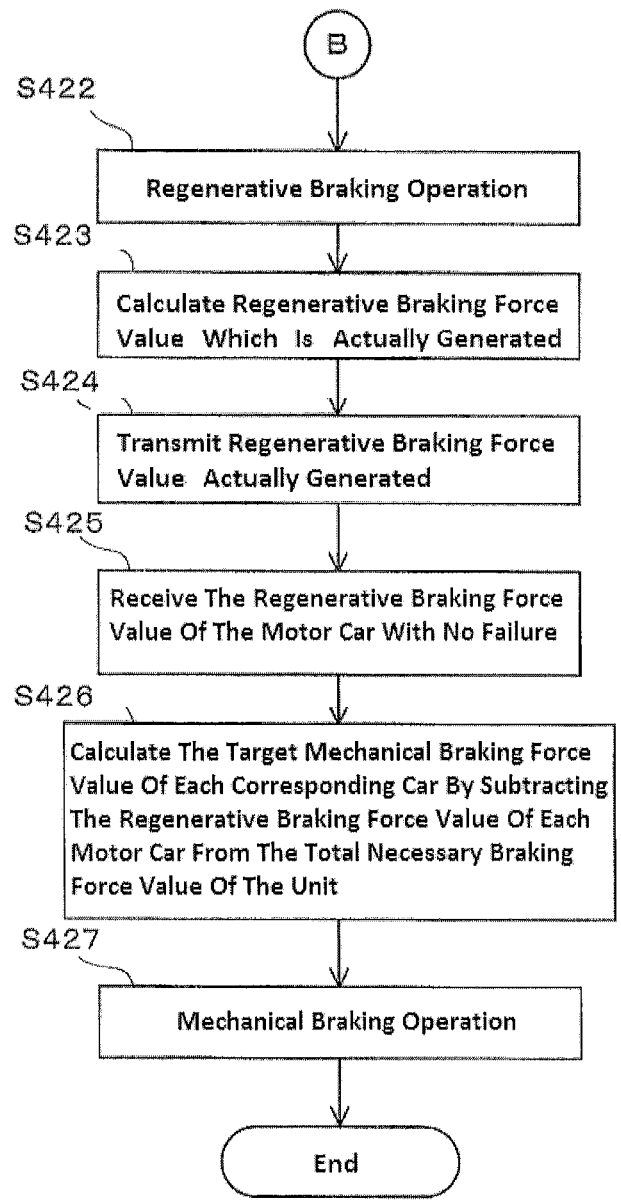
FIG. 23 is a flow diagram illustrating the example of the process performed (d-1) when the motor car and the trailer car that operate normally perform the braking operation in cooperation.

FIGS. 22 and 23 are flow diagrams illustrating an example of a process performed (d-1) when the motor car 103 and the trailer car 101 cooperate with each other to perform a braking operation. Referring to FIGS. 20, 22, 23, when the motor car 103 and the trailer car 101 cooperate to perform a braking operation, the motor car 103 and the trailer car 101 in which no failure occurs may estimate the necessary braking force value BR2$d$ of the motor car 102 in which the failure occurs and may then perform the same processes as those of the normal operation of the brake system 1.

More specifically, when the brake control devices 11, 13 receive the deceleration command signal S1 from the operation apparatus 105 (step S411), the brake control devices 12, 13 firstly calculate (estimate) the weight W102 of the motor car 102 in which the failure occurs (step S412). The brake control devices 11, 13 calculate the weight W102 of the motor car 102 based on a necessary braking force BR2$d'$ that is calculated by the brake control device 12 and is the latest available before the communication failure occurs in the motor car 102 and the deceleration command signal S1 at the time.

The brake control devices 11, 13 then calculate (estimate) the necessary braking force value BR2$d$ of the motor car 102 based on the weight W102 of the motor car 102 in which the failure occurs and a deceleration specified by the latest deceleration command signal S1 (step S413). The brake control devices 11, 13 in the normally operating motor car 102 and the trailer car 101 then obtain the pressure detection signals P1, P3 of the cars 101, 103 respectively from the corresponding pressure sensors 41, 43 (step S414).

The brake control devices 11, 13 calculate the weights W103, W101 of the motor car 103 and the trailer car 101 from the pressure detection signals P1, P3 (step S415). The brake control devices 11, 13 calculate the necessary braking force values BR1$d$, BR3$d$ that are required for braking the cars 101, 103 based on the weights W102, W103 and the deceleration specified by the deceleration command signal S1 (step S416).

The brake control devices 11, 13 then calculate a total necessary braking force value BRA$d$ that is required for the whole unit 104 by adding the necessary braking force values BR1$d$, BR3$d$ of the motor car 103 and the trailer car 101 in which no failure occurs to the estimated necessary braking force value BR2$d$ (step S417). The brake control devices 11, 13 then calculate an corrected total necessary braking force value BRA$d'$ by subtracting a target mechanical braking force value BM1$d$ generated in the motor car 102 from the total necessary braking force value BRA$d$ (step S418).

The brake control device 13 may then estimate a target regenerative braking force value BRE30$d$ which the car 103 bears (step S419). In this case, the brake control device 13 may set the target regenerative braking force value BRE30$d$ to a value closest possible to the corrected total necessary braking force value BRA$d'$.

The brake control device 13 may output the target regenerative braking force value BRE30$d$ of the car 103 to the transmission device 20 (step S420).

The motor control device 63 may then receive the target regenerative braking force value BRE30$d$ calculated by the brake control device 13 (step S421). The motor control device 63 causes the motor 103$b$ to perform the regenerative braking operation that generates the corresponding target regenerative braking force value BRE30$d$ by controlling the motor 103$b$. The brake control device 13 may then calculate an effective regenerative braking force value (a regenerative braking force value BRE31$d$) which is actually generated from the electric currents and voltages generated in the motor 103$b$ (step S423). The brake control device 13 may output the calculated regenerative braking force value BRE31$d$ to the transmission device 20 (step S424).

The brake control devices 11, 13 may then receive the regenerative braking force value BRE31$d$ of the motor car 103 (step S425). The brake control devices 11, 13 then calculate the target mechanical braking force values BM1$d$, BM3$d$, respectively, which the mechanical brake devices 31, 32 in the cars 101, 103 should generate (step S426). More specifically, the brake control devices 11, 13 respectively subtract the total regenerative braking force value BRE31$d$ of the whole unit 104 from the corrected total necessary braking force value BRA$d'$ to calculate the sum of the target mechanical braking force values BM1$d$, BM3$d$ (step S426). In this case, each of the target mechanical braking force values BM1$d$, BM3$d$ may be set as an equal value or may be set in accordance with the weights of the corresponding car 101, 103.

The brake control devices 11, 13 then cause the corresponding mechanical brake devices 31, 33 to operate such that they generate the target mechanical braking force values BM1*d*, BM3*d* respectively (step S427).

When the transmission failure (d) described above occurs, the deceleration command signal S1 from the operation apparatus 105 is changed and the required deceleration is decreased, the change of the deceleration command signal S1 cannot be transmitted to the brake control device 12. In this case, it is considered that the mechanical brake device 32 and the motor 102*b* generate a larger-than-necessary mechanical braking force. Therefore the brake control devices 11, 13 should set a necessary braking force value smaller than the usual necessary braking force value set at the time of normal operation. In this way, it is possible for the brake control devices 11-13 to generate the right amount of the braking force for the entire unit 104.

Note that, in the step S404 in FIG. 21, the motor car 103 and the trailer car 101 in which no failure occurs may independently perform the braking operation instead of the process described above with reference to FIGS. 22 and 23. In this case, the motor car 103 performs the same process as that of the steps S121-S128 in FIG. 13. The trailer car 101 also performs the same process as that of the steps S111-S115 in FIG. 12. The brake control devices 11, 13 may be operated to generate a braking force value corresponding to the sum of the necessary braking force values of the cars 101, 103 other than the motor car 102.

As described above, in the brake system 1 according to the embodiment, when the brake system 1 normally operates, each brake control device 10 uses the information from the other brake control device 10 to calculate the total necessary braking force value BRA that is required to put a brake on the whole unit 104 including the cars 101, 102, 103. Therefore it is possible for the brake system 1 to perform the braking process of the cars 101, 102, 103. The brake control devices 11, 12, 13 are provided in the cars 101, 102, 103 of the unit 104 respectively. Therefore, even when a failure occurs in the transmission device 20, the control by each brake control device 10 can cause the cars 101, 102, 103 in the unit 104 to perform the brake operation. In this way, multiplexing of the brake control device 10 can be achieved. Moreover, the multiplexing can be realized with a simple configuration in which the brake control device 10 is provided for each of the cars 101, 102, 103. In this manner, the multiplexing of the control can be realized with the simple configuration.

Furthermore, in the brake system 1 according to the embodiment, each brake control device 10 calculates the necessary braking force value BR1, BR2, BR3 that is required to put a brake on the corresponding car 101, 102, 103 in response to the reception of the deceleration command signal S1 and then transmits the necessary braking force value BR1, BR2, BR3, respectively, to the transmission device 20. With this configuration, the information necessary to calculate the total necessary braking force value BRA can be obtained by calculating the necessary braking force value BR1, BR2, BR3 that are required to put a brake on the cars 101, 102, 103 respectively by the corresponding brake control device 10.

Moreover, in the brake system 1, each brake control device 10 may calculate the total necessary braking force value BRA by adding the necessary braking force value (one of BR1, BR2, BR3) that is required to put a brake on the corresponding car 101, 102, 103 to the necessary braking force values (other two of BR1, BR2, BR3) calculated by other brake control devices 10. In this manner, the brake system 1 can calculate the total necessary braking force value BRA with the simple configuration.

Furthermore, in the brake system 1, the brake control device 12, 13 may calculate the target regenerative braking force values BRE20, BRE30 respectively to be generated by the motors 102*b*, 103*b* based on the total necessary braking force value BRA. In this manner, the brake control system 1 can estimate more appropriate target regenerative braking force values BRE20, BRE30.

Moreover, in the brake system 1, each brake control device 10 calculates the target mechanical braking force value BM1, BM2, BM3 to be generated by the mechanical brake device 31, 32, 33 of the corresponding cars 101, 102, 103 respectively based on a value obtained by subtracting the effective regenerative braking force values BRE21, BRE31 actually generated in the motor cars 102, 103 from the total necessary braking force value BRA. In this way, the brake system 1 can estimate more appropriate target mechanical braking force values BR1, BE2, BR3.

Moreover, in the brake system 1, in the case of (a), in other words, when the brake control device 11 cannot transmit information to the transmission device 20, the brake control device 11 calculates the necessary braking force value BR1*a* that is required to put a brake on the trailer car 101 without using the information output from the other brake control devices 12, 13 to the transmission device 20. In this manner, the brake control device 11 can calculate the necessary braking force value BR1*a* that is required to put a brake on the trailer car 101 even when a communication failure occurs in the brake control device 11. Therefore the brake control device 11 can perform a brake control of the trailer car 101 and can prevent a deficiency in the total braking force of the unit 104.

Moreover, in the brake system 1, in the case of (a), in other words, when the brake control device 12 cannot transmit information to the transmission device 20, the brake control device 12 calculates the necessary braking force value BR2*a* that is required for braking the motor car 102 without using the information output from the other brake control devices 11, 13 to the transmission device 20. In this manner, the brake control device 12 can calculate the necessary braking force value BR2*a* that is required for braking the motor car 102 even when a communication failure occurs in the brake control device 12. Therefore the brake control device 12 can perform a brake control of the motor car 102 and can prevent a deficiency in the total braking force of the unit 104.

Moreover, in the brake system 1, in the case of (b), in other words, when the brake control device 12 cannot transmit information to the transmission device 20, the brake control device 12 of the motor car 102 calculates the necessary braking force value BR2*b* that is required to put a brake on the motor car 102 without using the information output from the other brake control devices 11, 13 to the transmission device 20. In this manner, the brake control device 12 can calculate the necessary braking force value BR2*b* that is required for braking the motor car 102 even when a communication failure occurs in the brake control device 12. Therefore the brake control device 12 can perform a brake control of the motor car 102 and can prevent a deficiency in the total braking force of the unit 104.

Moreover, according to the brake system 1, in the case of (b), in other words, when the brake control device 12 of the motor car 102 cannot transmit information to the transmission device 20, the brake control device 12 does not cause the motor 102*b* to perform a regenerative braking operation but cause the mechanical brake device 32 to operate. In this way, it is possible for the brake control device 12 to cause the mechanical brake device 32 to perform the braking operation even when the information cannot be communicated to the transmission device 20.

Moreover, in the brake system 1, in the case of (b), in other words, when the brake control device 12 cannot transmit information to the transmission device 20, the other brake control devices 11, 13 calculate the necessary braking force value BR1$b$+BR3$b$ that is required for braking the cars 21, 23 other than the motor car 102. In this way, even when a communication failure occurs in the brake control device 12 of the motor car 102, the brake control devices 11, 13 other than the brake control device 12 in which the communication failure occurs can cooperate to perform the brake control over the cars 21, 23. Consequently, it is possible to prevent insufficiency of braking force for the unit 104 as a whole.

Moreover, in the brake system 1, in the case of (c), in other words, when the brake control device 11 of the trailer car 101 cannot receive information from the transmission device 20, the brake control device 11 calculates the necessary braking force value BR1$c$ that is required for braking the trailer car 101 without using the information output from the other brake control devices 12, 13 to the transmission device 20. In this manner, the brake control device 11 can calculate the necessary braking force value BR1$c$ that is required for braking the trailer car 101 even when a communication failure occurs in the brake control device 11 of the trailer car 101. Therefore the brake control device 11 can perform a brake control of the trailer car 101 and can prevent a deficiency in the total braking force of the unit 104.

Moreover, in the brake system 1, in the case of (c), in other words, when the brake control device 11 of the trailer car 101 cannot receive information from the transmission device 20, the brake control device 11 calculates the necessary braking force value BR1$c$ that is required to put a brake on the trailer car 101 based on the deceleration command signal S1 as of the reception failure. In this manner, the brake control device 11 can continue the process of putting a brake on the trailer car 101 even when a communication failure occurs.

Moreover, in the brake system 1, in the case of (c), in other words, when the brake control device 11 of the trailer car 101 cannot receive information from the transmission device 20, the other brake control devices 12, 13 calculate the necessary braking force values BR2$c$ and BR3$c$ that are required to put a brake on the cars 102, 103 respectively, and estimate the necessary braking force value BR1$c$ that is required for braking the trailer car 101 in order to calculate the total necessary braking force value BRA$c$ that is required for braking all of the cars 101, 102, 103. In this way, by considering the trailer car 101 in which a communication failure occurs, it is possible for the brake control devices 12, 13 to accurately calculate the necessary braking force values BR2$c$ and BR3$c$ that should be generated in the cars 102, 103.

Furthermore, in the brake system 1, in the case of (c), the other brake control devices 12, 13 estimate the necessary braking force value BR1$c$ that is required for braking the trailer car 101 based on the necessary braking force value BR1$c$ which the brake control device 11 of the trailer car 101 calculated before the reception failure occurs. In this way, the brake control devices 12, 13 other than the brake control device 11 can accurately calculate the necessary braking force value BR1$c$ that is required to put a brake on the trailer car 101 even when a communication failure occurs in the brake control device 11.

Furthermore, in the brake system 1, in the case of (c), when the brake control device 11 of the trailer car 101 becomes incapable of receiving information from the transmission device 21 during the deceleration operation of the trailer car 101, the other brake control devices 12, 13 calculate the corrected total necessary braking force value BRA$c'$ by subtracting the necessary braking force value BR1$c$ that is generated during the deceleration operation of the trailer car 101 from the total necessary braking force value BRA$c$. In this way, by considering the braking operation which the failure-occurring brake control device 11 performs, it is possible for the other brake control devices 12, 13 to accurately calculate the necessary braking force values that should be generated in the corresponding cars 102, 103.

Moreover, in the brake system 1, in the case of (d), in other words, when the brake control device 12 of the motor car 102 cannot receive information from the transmission device 20, the brake control device 12 calculates the necessary braking force value BR2$d$ that is required to put a brake on the motor car 102 without using the information output from the other brake control devices 11, 13 to the transmission device 20. In this manner, the brake control device 12 of the motor car 102 can calculate the necessary braking force value BR2$d$ that is required for braking the motor car 102 even when a communication failure occurs in the brake control device 12. Therefore the brake control device 12 can perform a brake control of the motor car 102 and can prevent a deficiency in the total braking force of the unit 104.

Moreover, in the brake system 1, in the case of (d), in other words, when the brake control device 12 of the motor car 102 cannot receive information from the transmission device 20, the brake control device 12 calculates the necessary braking force value BR2$d$ based on the deceleration command signal S1 as of the reception failure. In this manner, the brake control device 12 can continue the process of putting a brake on the motor car 102 even when a communication failure occurs.

Moreover, according to the brake system 1, in the case of (d), in other words, when the brake control device 12 of the motor car 102 cannot transmit information to the transmission device 20, the brake control device 12 does not cause the motor 102$b$ to perform a regenerative braking operation but cause the mechanical brake device 32 to operate. In this way, the brake control device 12 can perform control such that an appropriate braking force is applied to the motor car 102 even when measurement of the regenerative braking force of the motor 102$b$ cannot be performed.

Moreover, in the brake system 1, when the brake control device 12 of the motor car 102 cannot receive information from the transmission device 20, the other brake control devices 11, 13 calculate the necessary braking force values BR1$d$ and BR3$d$ that are required to put a brake on the cars 101, 103, respectively, and estimate the necessary braking force value BR1$d$ that is required for braking the motor car 102 in order to calculate the total necessary braking force value BRA$d$ that is required to put a brake on all of the cars 102, 102, 103. In this way, by considering the motor car 102 in which a communication failure occurs, it is possible for the other brake control devices 11, 13 to accurately calculate the necessary braking force values BR1$d$ and BR3$d$ that should be generated in the cars 101, 103.

Furthermore, in the brake system 1, in the case of (d), the other brake control devices 11, 13 estimate the necessary braking force value BR2$d$ that is required for braking the motor car 102 based on the necessary braking force value BR2$d'$ which the brake control device 12 of the trailer car 102 calculated before the reception failure occurs and which is required to put a brake on the motor car 102. In this manner, the other brake control devices 11, 13 can accurately calculate the necessary braking force value BR2d that is required to put a brake on the motor car 102 even when a communication failure occurs in the brake control device 12 of the motor car 102.

Furthermore, in the brake system 1, in the case of (d), when the brake control device 12 of the motor car 102 becomes incapable of receiving information from the transmission device 20 during the deceleration operation of the motor car 102, the other brake control devices 11, 13 calculate the corrected total necessary braking force value BRAd' by subtracting the braking force value (the target mechanical braking force value BM1d) that is generated during the deceleration operation of the motor car 102 from the total necessary braking force value BRAd. In this way, by considering the braking operation which the failure-occurring brake control device 12 performs, it is possible for the other brake control devices 11, 13 to accurately calculate the necessary braking force values that should be generated in the corresponding cars 101, 103.

Although the embodiments of the present invention have been described above, the present invention is not restricted to the above-described embodiments, and various modifications are possible within the scope of the claims.

The present invention can be broadly applied as a brake system, a brake control device, and a method of controlling brakes for railroad cars.

LIST OF REFERENCE NUMBERS

1 brake system for railroad cars
10-13 brake control device
20-23 transmission device
101 trailer car (car)
102 motor car
103 motor car
104 unit
BRA total necessary braking force value

What is claimed is:

1. A brake system for railroad cars that form a unit, comprising:
   brake control devices, each brake control device being provided in a corresponding one of the railroad cars,
   wherein each of the brake control devices is configured to output information about the corresponding railroad car in which the brake control device is provided to the other brake control devices through a transmission device,
   wherein each of the brake control devices is also configured to calculate a total necessary braking force value by using the information output from the other brake control device(s) to the transmission device, the total necessary braking force value being required for braking all of the railroad cars forming the unit,
   wherein each of the brake control devices is configured to, upon receiving a deceleration command signal, calculate a necessary braking force that is required for braking the corresponding car and output the necessary braking force value as the information to the transmission device, and
   wherein each of the brake control devices is configured to calculate the total necessary braking force value by adding the necessary braking force values calculated by the other brake control devices to the necessary braking force value that is required for braking the corresponding car.

2. The brake system for railroad cars according to claim 1, wherein one of the brake control devices is configured as a motor-car brake control device provided in a motor car that is the railroad car equipped with a motor, and the motor-car brake control device is configured to calculate a target regenerative braking force value that it to be generated in the motor based on the total necessary braking force value.

3. The brake system for railroad cars according to claim 2, wherein the railroad cars each include a mechanical brake device that imparts a frictional resistance to a wheel, and the brake control devices are each configured to calculate a target mechanical braking force value that is to be generated by the mechanical brake device of the corresponding car based on a value obtained by subtracting a regenerative braking force value actually generated in the motor car from the total necessary braking force value.

4. The brake system for railroad cars according to claim 1, wherein one of the brake control devices is configured as a trailer-car brake control device provided in a trailer car that is one of the railroad cars, and when the trailer-car brake control device cannot transmit the information to the transmission device, the trailer-car brake control device is configured calculate a necessary braking force value that is required for braking the trailer car without using the information output from the other brake control devices to the transmission device.

5. The brake system for railroad cars according to claim 4, wherein one of the brake control devices is configured as a motor-car brake control device provided in a motor car that is the railroad car equipped with a motor, and when the trailer-car brake control device cannot transmit the information to the transmission device, the motor-car brake control device is configured to calculate a necessary braking force value that is required for braking the motor car without using the information output from the other brake control devices to the transmission device.

6. The brake system for railroad cars according to claim 1, wherein one of the brake control devices is configured as a motor-car brake control device provided in a motor car that is the railroad car equipped with a motor, and
   when the motor-car brake control device cannot transmit the information to the transmission device, the motor-car brake control device is configured to calculate a necessary braking force value that is required for braking the motor car without using the information output from the other brake control devices to the transmission device.

7. The brake system for railroad cars according to claim 6, wherein the motor car includes the motor coupled to a wheel of the motor car, and a mechanical brake device that imparts a frictional resistance to the wheel, and the motor-car brake control device causes the mechanical brake device to operate without causing the motor to perform a regenerative braking operation.

8. The brake system for railroad cars according to claim 6, wherein the brake control devices other than the motor-car brake control device are herein referred to as predetermined brake control devices, and when the information cannot be transmitted from the motor-car brake control device to the transmission device, the predetermined brake control devices are each configured to calculate a necessary braking force value that is required for braking the cars other than the motor car.

9. The brake system for railroad cars according to claim 1, wherein one of the brake control devices is configured as a trailer-car brake control device provided in a trailer car that is one of the railroad cars, and when the trailer-car brake control device cannot receive the information from the transmission device, the trailer-car brake control device is configured to calculate a necessary braking force value that is required for braking the trailer car without using the information output from the other brake control devices to the transmission device.

10. The brake system for railroad cars according to claim 9, wherein when the trailer-car brake control device cannot receive the information from the transmission device, the trailer-car brake control device is configured to calculate the necessary braking force value that is required to put a brake on the trailer car based on a deceleration command signal at the time when the reception failure occurs.

11. The brake system for railroad cars according to claim 9, wherein the brake control devices other than the trailer-car brake control device are herein referred to as predetermined brake control devices, and when the trailer-car brake control device cannot receive the information from the transmission device, the predetermined brake control devices are each configured calculate a necessary braking force value that is required to put a brake on the corresponding car and estimate a necessary braking force value that is required to put a brake on the trailer car in order to calculate a total necessary braking force value that is required for braking all of the cars.

12. The brake system for railroad cars according to claim 11, wherein the predetermined brake control devices estimate the necessary braking force value that is required for braking the trailer car based on a necessary braking value that is required for braking the trailer car and calculated by the trailer-car brake control device before the reception failure occurs.

13. The brake system for railroad cars according to claim 11, wherein when the trailer-car brake control device becomes incapable of receiving the information from the transmission device while a deceleration operation is performed in the trailer car, the predetermined brake control devices is configured to calculate a corrected total necessary braking force value by subtracting a braking force value generated in the deceleration operation of the trailer car from the total necessary braking force value.

14. The brake system for railroad cars according to claim 1, wherein one of the brake control devices is configured as a motor-car brake control device provided in a motor car that is the railroad car equipped with a motor, and when the motor-car brake control device cannot receive the information from the transmission device, the motor-car brake control device is configured to calculate a necessary braking force value that is required for braking the motor car without using the information output from the other brake control devices to the transmission device.

15. The brake system for railroad cars according to claim 14, wherein when the motor-car brake control device cannot receive the information from the transmission device, the motor-car brake control device is configured to calculate a necessary braking force value that is required for braking the motor car based on a deceleration command signal at the time when the reception failure occurs.

16. The brake system for railroad cars according to claim 14, wherein the motor car includes the motor coupled to a wheel of the motor car, and a mechanical brake device that imparts a frictional resistance to the wheel, and when the motor-car brake control device cannot receive the information from the transmission device, the motor-car brake control device is configured to the mechanical brake device to operate without causing the motor to perform a regenerative braking operation.

17. The brake system for railroad cars according to claim 14, wherein the brake control devices other than the motor-car brake control device are herein referred to as predetermined brake control devices, and when the motor-car brake control device cannot receive the information from the transmission device, the predetermined brake control devices are each configured to calculate a necessary braking force value that is required for braking the corresponding car and estimate a necessary braking force value that is required for braking the motor car in order to calculate a total necessary braking force value that is required for braking all of the cars.

18. The brake system for railroad cars according to claim 17, wherein the predetermined brake control devices is configured to estimate the necessary braking force value that is required for braking the motor car based on a necessary braking value that is required for braking the motor car and calculated by the motor-car brake control device before the reception failure occurs.

19. The brake system for railroad cars according to claim 17, wherein when the motor-car brake control device becomes incapable of receiving the information from the transmission device while a deceleration operation is performed in the motor car, the predetermined brake control devices are each configured to calculate a corrected total necessary braking force value by subtracting a braking force value generated in the deceleration operation of the motor car from the total necessary braking force value.

20. A brake control device used for the brake system for railroad cars according to claim 1, wherein each brake control device is capable of outputting information about the corresponding car in which the brake control device is provided to the other brake control devices through a transmission device, and configured to calculate a total necessary braking force value by using the information output from the other brake control devices to the transmission device, the total necessary braking force value being required for braking all of the railroad cars.

21. A method of controlling brakes on railroad cars forming a unit, comprising:
  outputting, by each of brake control devices provided in a corresponding one of the railroad cars, information about the corresponding railroad car in which the brake control device is provided through a transmission device to the other brake control devices;
  calculating, by each of the brake control devices, a total necessary braking force value by using the information output from the other brake control devices to the transmission device, the total necessary braking force value being required to put for braking all of the railroad cars forming the unit;
  calculating, upon receipt of a deceleration command signal by each of the brake control devices, a necessary braking force that is required for braking the corresponding railroad car and outputting the necessary braking force value as the information to the transmission device; and
  calculating, by each of the brake control devices, the total necessary braking force value by adding the necessary braking force values calculated by the other brake control devices to the necessary braking force value that is required for braking the corresponding railroad car.

* * * * *